United States Patent
Gorokhov et al.

(10) Patent No.: US 8,938,247 B2
(45) Date of Patent: Jan. 20, 2015

(54) SOUNDING REFERENCE SIGNAL FOR COORDINATED MULTI-POINT OPERATION

(75) Inventors: Alexei Y. Gorokhov, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 977 days.

(21) Appl. No.: 12/764,891

(22) Filed: Apr. 21, 2010

(65) Prior Publication Data

US 2011/0098054 A1   Apr. 28, 2011

Related U.S. Application Data

(60) Provisional application No. 61/172,149, filed on Apr. 23, 2009.

(51) Int. Cl.
*H04W 72/04* (2009.01)
*H04W 88/06* (2009.01)
*H04B 7/00* (2006.01)
*H04L 5/00* (2006.01)
(Continued)

(52) U.S. Cl.
CPC .............. *H04L 5/0048* (2013.01); *H04B 7/024* (2013.01); *H04L 5/0035* (2013.01); *H04L 5/0091* (2013.01); *H04W 52/325* (2013.01); *H04W 52/40* (2013.01)
USPC ...................... 455/452.1; 455/422.1; 455/517; 455/522; 370/256; 370/280; 370/345

(58) Field of Classification Search
USPC ............ 455/522, 422.1, 517, 452.1; 370/256, 370/280, 345, 344, 526
See application file for complete search history.

(56) References Cited

U.S. PATENT DOCUMENTS 8,099,132 B2 *   1/2012   Kim et al. .................. 455/562.1
2008/0045260 A1 *   2/2008   Muharemovic et al. ...... 455/522
(Continued)

FOREIGN PATENT DOCUMENTS

WO    WO03047176 A1    6/2003

OTHER PUBLICATIONS

3GPP TS36.211 (Evolved Universal Terrestrial Radio Acccess (E-UTRA); Physical Channels and Modulation (release 8) Dec. 2008.*

(Continued)

*Primary Examiner* — Kashif Siddiqui
*Assistant Examiner* — Farideh Madani

(57) ABSTRACT

Systems and methodologies are described that facilitate configuring a sounding reference signal transmission in a wireless communication environment. A UE can employ coordinated multi-point transmission and/or reception such that multiple cells collaborate to transmit data to the UE and/or receive data from the UE. To support the coordinated multi-point transmission and/or reception, the UE can transmit a sounding reference signal that is configured to enable reliable reception of the sounding reference signal by members of a cooperating set. In addition, configuration of the sounding reference signal can be coordinated to enable more efficient transmission and utilization of the sounding reference signal. Configuration of the sounding reference signal can be based upon information exchanged between the multiple cells. Moreover, the multiple cells can coordinate to set and control a transmit power of the sounding reference signal.

45 Claims, 15 Drawing Sheets

(51) Int. Cl.
  *H04B 7/02* (2006.01)
  *H04W 52/32* (2009.01)
  *H04W 52/40* (2009.01)

(56) References Cited

U.S. PATENT DOCUMENTS

| | | | |
|---|---|---|---|
| 2008/0200203 A1* | 8/2008 | Malladi et al. | 455/522 |
| 2008/0233967 A1 | 9/2008 | Montojo et al. | |
| 2009/0046800 A1* | 2/2009 | Xu et al. | 375/267 |
| 2009/0054093 A1* | 2/2009 | Kim et al. | 455/500 |
| 2010/0173660 A1* | 7/2010 | Liu et al. | 455/501 |

OTHER PUBLICATIONS

3GPP TS36.211 (Evolved Universal Terrestrial Radio Access (E-UTRA); Physical Channels and Modulation (release 8) Dec. 2008.*

"Summary of Power Control Email Discussion", Source: Nokia Siemens Networks, 3GPP TSG RAN WG1 #49, R1-072276, Kobe, Japan, May 7-11, 2007.

"Summary of Power Control Email Discussion", Source: Nokia Siemens Networks, 3GPP TSG RAN WG1 #49bis, R1-072973, Orlando, USA, Jun. 25-29, 2007.

Ericsson: "R1-082469, LTE Advanced—Coordinated Multipoint transmission/reception", 3GPP, [Online] No. R1-082469, pp. 1-6, XP002574186, Retrieved from the Internet: URL:http://www.3gpp.org/FTP/Specs/html-lnf o/TDocExMt—R1-53b—27098. htm> [retrieved on Mar. 17, 2010].

International Search Report and Written Opinion—PCT/US2010/032283—International Search Authority, European Patent Office,Jan. 5, 2011.

Motorola, "Sounding Reference Signal Power Setting", R1-073405, 3GPP TSG RAN1 #50, Athens, Greece, Aug. 20-24, 2007.

Taiwan Search Report—TW099113059—TIPO—Jun. 4, 2013.

* cited by examiner

US 8,938,247 B2

SOUNDING REFERENCE SIGNAL FOR COORDINATED MULTI-POINT OPERATION

CLAIM OF PRIORITY UNDER 35 U.S.C. §119

The present Application for Patent claims priority to U.S. Provisional Application Ser. No. 61/172,149, filed Apr. 23, 2009, entitled "SRS DESIGN FOR LTE-A DL CoMP OPERATION." The aforementioned U.S. Provisional Application is assigned to the assignee hereof and hereby expressly incorporated by reference in their entirety.

BACKGROUND

I. Field

The following description relates generally to wireless communications, and more particularly to facilitating sounding reference signal configuration and transmission while supporting coordinated multipoint transmission/reception operations.

II. Background

Wireless communication systems are widely deployed to provide various types of communication content such as voice and data. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, High Speed Packet Access (HSPA), High Speed Downlink Packet Access (HSDPA), High Speed Uplink Packet Access (HSUPA), 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As wireless communications continue to grow in popularity, consumers demand additional features and greater performance. Such features can require high data rates, which can be difficult to reliably achieve within a limited bandwidth, power constraints, and/or interference constraints of a wireless communication system. One option to increase bandwidth (e.g., widen bandwidth), without a large impact on the complexity of radio equipment (e.g., transmitters and receivers), is to implement carrier aggregation. With carrier aggregation, multiple component carriers can be aggregated or grouped to result in an overall wider system bandwidth. Each component carrier can include a complete downlink and uplink with control and traffic channels. Thus, each component carrier can appear as an individual deployment of a wireless communication technology.

Another option is to employ multi-antenna solutions to improve reliable transmission and reception of information. For example, multiple input, multiple output (MIMO) techniques can be applied on the downlink as well as uplink. In addition, beamforming mechanisms, such as codebook-based precoding or classical beamforming via dedicated reference signals, can be utilized.

Further, coordinated multi-point (CoMP) techniques can be employed to improve communication. For instance, data can be transmitted to a mobile device via downlink channels associated with two or more base stations. In addition, data can be received from the mobile device on uplink channels associated with two or more base stations. However, channel status and/or other feedback information beneficial to support communications can increase interference during CoMP operations.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating configuration of a sounding reference signal transmission in a wireless communication environment. A UE can employ coordinated multi-point transmission and/or reception such that multiple cells collaborate to transmit data to the UE and/or receive data from the UE. To support the coordinated multi-point transmission and/or reception, the UE can transmit a sounding reference signal that is configured to enable reliable reception of the sounding reference signal by members of a cooperating set. Configuration of the sounding reference signal can be based upon information exchanged between the multiple cells. Moreover, the multiple cells can coordinate to set and control a transmit power of the sounding reference signal. Another aspect relates to coordinated configurations of the sounding reference signal to enable more efficient transmission and utilization of the sounding reference signal.

According to related aspects, a method is described herein that can include receiving first configuration information from a first node in a cooperating set, wherein the cooperating set includes a plurality of nodes that collaborate to provide coordinated multi-point reception or transmission. Further, the method can include generating a sounding reference signal based at least in part on the first configuration information. In addition, the method can include transmitting the sounding reference signal to one or more nodes in the plurality of nodes.

Another aspect relates to a wireless communications apparatus. The wireless communication apparatus can include at least one processor configured to receive configuration information from a node in a cooperating set, wherein the cooperating set includes a plurality of nodes that collaborate to provide coordinated multi-point reception or transmission. Further, the at least one processor can be configured to generate a sounding reference signal based at least in part on the configuration information. In addition, the at least one processor can be configured to transmit the sounding reference signal to one or more nodes in the plurality of nodes.

Yet another aspect relates to an apparatus that can include means for receiving first configuration information from a first node in a cooperating set, wherein the cooperating set includes a plurality of nodes that collaborate to provide coordinated multi-point reception or transmission. In addition, the apparatus can include means for generating a sounding reference signal based at least in part on the first configuration information. Further, the apparatus can include means for transmitting the sounding reference signal to one or more nodes in the plurality of nodes.

Still another aspect relates to a computer program product that can comprise a computer-readable medium. The computer-readable medium can include code for causing at least one computer to receive configuration information from a node in a cooperating set, wherein the cooperating set includes a plurality of nodes that collaborate to provide coordinated multi-point reception or transmission. Further, the computer-readable medium can include code for causing the at least one computer to generate a sounding reference signal based at least in part on the configuration information. In addition, the computer-readable medium can include code for causing the at least one computer to transmit the sounding reference signal to one or more nodes in the plurality of nodes.

In accordance with another aspect, an apparatus is described. The apparatus can include a configuration module that obtains configuration information from a node in a cooperating set and generates a set of configuration parameters in accordance with the configuration information, wherein the cooperating set includes a plurality of nodes that collaborate to provide coordinated multi-point reception or transmission. In addition, the apparatus can include a generation module that generates a sounding reference signal in accordance with the set of configuration parameters. Further, the apparatus can include a transmission module that transmits the sounding reference signal to one or more nodes in the cooperating set.

According to other aspects, a method is described that can include obtaining cell information from a neighbor cell via a backhaul, wherein the neighbor cell is included in a cooperating set associated with a mobile device. Further, the method can include generating a set of configuration parameters in accordance with the cell information, wherein the set of configuration parameters relate to transmission of a sounding reference signal. In addition, the method can include transmitting the set of configuration parameters to the mobile device.

Another aspect relates to a wireless communications aspect comprising at least one processor, wherein the at least one processor can be configured to receive cell information from a neighbor cell via a backhaul, wherein the neighbor cell is included in a cooperating set associated with a mobile device. The at least one processor can further be configured to determine a set of configuration parameters in accordance with the cell information, wherein the set of configuration parameters relate to transmission of a sounding reference signal. In addition, the at least one processor can be configured to transmit the set of configuration parameters to the mobile device.

Yet another aspect relates to an apparatus that can include means for means for obtaining cell information from a neighbor cell via a backhaul, wherein the neighbor cell is included in a cooperating set associated with a mobile device. The apparatus can further include means for generating a set of configuration parameters in accordance with the cell information, wherein the set of configuration parameters relate to transmission of a sounding reference signal. In addition, the apparatus can include means for transmitting the set of configuration parameters to the mobile device.

Still another aspect relates to a computer program product that can comprise a computer-readable medium. The computer-readable medium can include code for causing at least one computer to obtain cell information from a neighbor cell via a backhaul, wherein the neighbor cell is included in a cooperating set associated with a mobile device. Further, the computer-readable medium can code for causing the at least one computer to generate a set of configuration parameters in accordance with the cell information, wherein the set of configuration parameters relate to transmission of a sounding reference signal. In addition, the computer-readable medium can include code for causing the at least one computer to transmit the set of configuration parameters to the mobile device.

In accordance with another aspect, an apparatus is described that can include a cell information evaluation module that obtains cell information from a neighbor cell, wherein the neighbor cell is included in a cooperating set with the apparatus. Further, the apparatus can include a configuration module that generates a set of configuration parameters related to sounding reference signal transmission, wherein the configuration module utilizes the cell information to generate the set of configuration parameters. The apparatus can further include a transmitter that sends the set of configuration parameters to a mobile device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
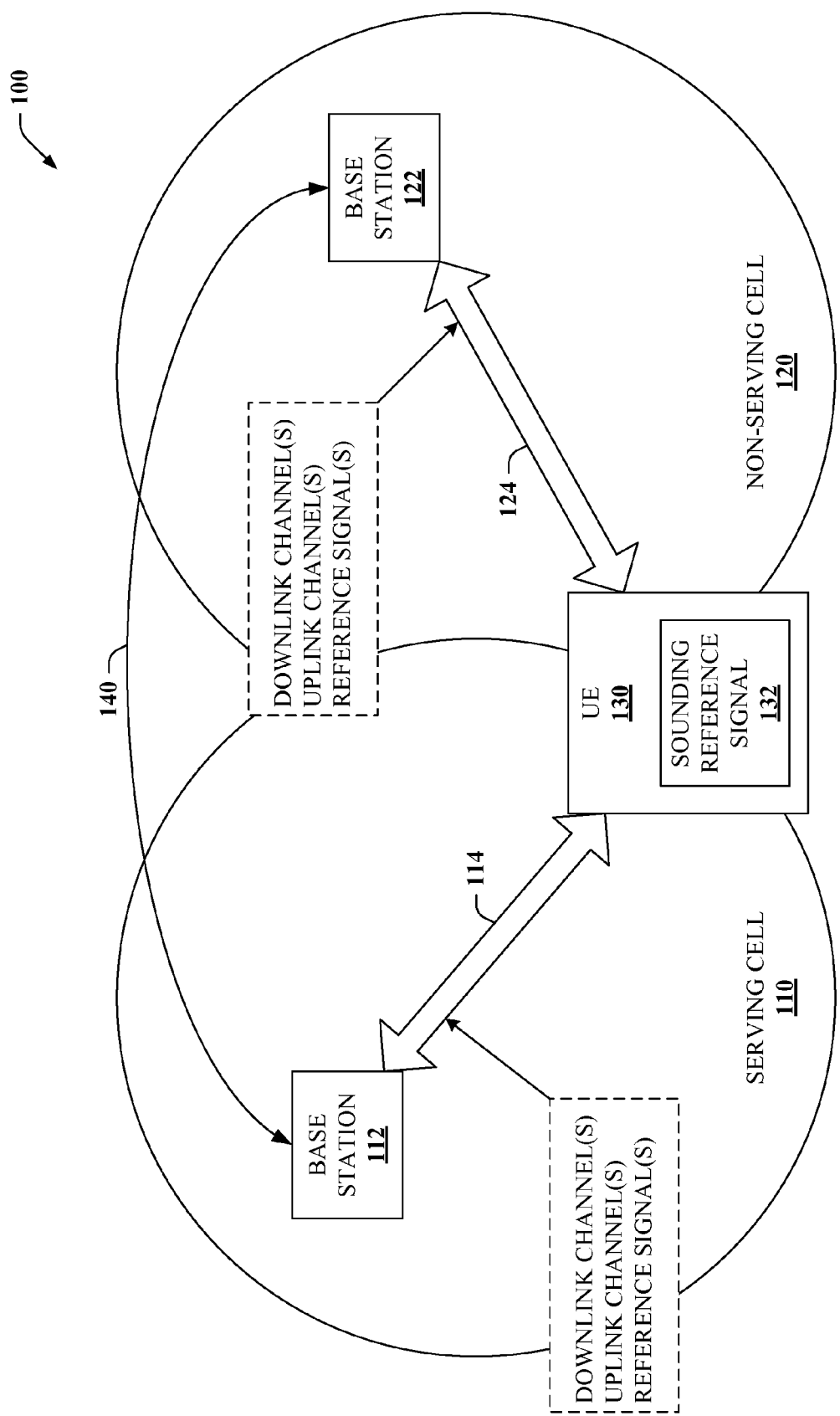
FIG. 1 illustrates an example wireless communication system that employs sounding reference signals to support coordinated multi-point operations in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, High Speed Packet Access (HSPA), High Speed Downlink Packet Access (HSDPA), High Speed Uplink Packet Access (HSUPA), etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. HSPA, HSDPA, HSUPA, UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques. For clarity, terminology associated with WCDMA, HSPA, HSDPA, and HSUPA are employed in description below. However, it is to be appreciated that the claims appended hereto are not intended to be limited to WCDMA, HSPA, HSDPA, and HSUPA, unless explicitly done so.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to drawings, FIG. 1 illustrates an example wireless communication system 100 that employs sounding reference signals to support coordinated multi-point operations in accordance with various aspects. Wireless communication system 100 includes a plurality of cells, wherein each cell is managed by at least one base station. For instance, FIG. 1 depicts two cells, serving cell 110 and non-serving cell 120, respectively managed by base stations 112 and 122. Wireless communication system 100 can further include user equipment (UE) 130 that communicates with base station 112 and/or base station 122 via wireless links 114 and 124, respectively. In an aspect, serving cell 110 can be a cell or geographical region in which UE 130 obtains wireless communication services. For instance, serving cell 110 includes base station 112 that actively communicates with UE 130. In contrast, non-serving cell 120 can be a cell neighboring serving cell 110. It should be appreciated that system 100 can operate in an WCDMA wireless network, an OFDMA wireless network, a CDMA network, a 3GPP LTE or LTE-A wireless network, a 3GPP2 CDMA2000 network, an EV-DO network, a WiMAX network, a HSPA network, etc.

In one example, base stations 112 and 122 can be access points, such as a macrocell access points, femtocell or picocell access points, NodeBs, eNodeBs (eNBs), mobile base stations, portions thereof, and/or substantially any devices or apparatus that provide access to a wireless communication network. While only serving cell 110, non-serving cell 120, base station 112, base station 122, and UE 130 are illustrated in FIG. 1, it should be appreciated that system 100 can include any number of UEs, cells, and/or base stations. In accordance with an aspect, base station 112 can transmit information to UE 130 over a forward link or downlink channel and UE 130 can transmit information to base station 112 over a reverse link or uplink channel, wherein the downlink channel and the uplink channel are included in wireless link 114. In addition, base station 122 and UE 130 can similarly communicate over downlink channels and/or uplink channels included in wireless link 124. To facilitate handover, as well as other functions of wireless communication system 100, base station 112 can communicate with base station 122 via a backhaul 140. Moreover, wireless links 114 and 124 can include reference signals such as common reference signals, UE-specific or dedicated reference signals, demodulation reference signals, and/or sounding reference signals.

In accordance with an aspect, UE 130 can generate a sounding reference signal (SRS) 132 that can facilitate uplink power control, uplink link adaptation and subband scheduling (e.g., frequency dependent uplink scheduling), time tracking, adaptive uplink antenna switching, downlink scheduling and beamforming (e.g., in TDD operation where channel reciprocity can be exploited), and the like. SRS 132 can be a physical signal that does not convey information provided from higher layers (e.g., protocol layers higher than a physical layer). Typically, SRS 132 is not associated with a particular transmission via a physical uplink control channel (PUCCH) and/or physical uplink shared channel (PUSCH). For instance, SRS 132 is typically not employed to facilitate coherent demodulation and decoding of uplink transmissions. Rather, UE 130 can transmit SRS 132 on frequencies different from uplink data transmissions (e.g., PUCCH or PUSCH transmissions) to facilitate a base station to evaluate the uplink between UE 130 and the base station across an entire system bandwidth and/or a portion thereof. Thus, the base station can schedule UE 130 on resource blocks of instantaneously good quality.

In a single cell configuration, wherein UE 130 primarily communicates bidirectionally with a wireless communication network via a single cell or base station (e.g., base station 112), UE 130 sends SRS 132 such that base station 112 reliably receives the reference signal. To this end, base station 112 configures transmission of SRS 132 by UE 130 by establishing a plurality of cell-specific and/or UE-specific parameters. In addition, base station 112 controls transmit power of SRS 132 through a combination of open-loop and closed-loop techniques.

In an aspect, power control of sounding references signals in a single cell configuration, such as LTE Release 8, can be coupled with power control of PUSCH. In an example, transmit power of UE 130 for a PUSCH transmission, $P_{PUSCH}$, in a subframe i can be controlled according to the following:

$$P_{PUSCH}(i) = \min\{P_{CMAX}, 10 \log_{10}(M_{PUSCH}(i)) + P_{O\_PUSCH}(j) + \alpha \cdot PL + \Delta_{TF}(i) + f(i)\}$$

Pursuant to this example, $P_{CMAX}$ is a configured maximum transmit power of UE 130, which represents an upper limit on transmit power. $M_{PUSCH}(i)$ is a transmission bandwidth assigned to UE 130 for PUSCH in subframe, i, and reflects that higher transmit power can be utilized for higher resource assignments. $P_{O\_PUSCH}(j)$ represents a parameter that is a sum of a cell-specific component and a UE-specific component. $P_{O\_PUSCH}(j)$ is dependent upon a PUSCH type, j, which can be 0 or 1 depending on whether the PUSCH transmission is associated with a semi-persistent grant or a dynamically scheduled grant, respectively. The parameter, α, represents a path loss compensation factor, which can range from 0 to 1 to indicate no compensation to full compensation, respectively, of an estimated path loss, PL, measured by UE 130. $\Delta_{TF}(i)$ represents a power adjustment offset based upon a modulation scheme and coding rate employed for the PUSCH transmission and can be disabled via UE-specific configuration. The parameter, f(i), represents power control adjustments based upon explicit power control commands included in downlink control information.

Transmit power of sounding reference signals follows PUSCH transmit power but can be adjusted by an offset and/or adjusted for bandwidth for the sounding reference signal. For instance, transmit power for sounding reference signals, $P_{SRS}(i)$, for a particular subframe, i, can be depicted as:

$$P_{SRS}(i) = \min\{P_{CMAX}, P_{SRS\_OFFSET} + 10 \log_{10}(M_{SRS}) + P_{O\_PUSCH}(j) + \alpha \cdot PL + f(i)\}$$

Pursuant to the above, $P_{SRS\_OFFSET}$ is a UE-specific configuration parameter that provides an additional power offset for sounding reference signals above PUSCH transmissions. $M_{SRS}$ is a transmission bandwidth of the sounding reference signal transmission. Accordingly, the power control commands, PUSCH offset configured by layer 3, path loss compensation factor, and estimated path loss, which influence PUSCH transmit power, can also be applied for sounding reference signal power control.

In addition to configuring power control and/or conveying explicit power commands, base station 112 can further configure additional parameters that influence transmission of SRS 132 by UE 130 in a single cell configuration. The additional parameters can include a plurality of cell-specific and/or UE-specific settings. In one example, base station 112 establishes a cell-specific timing parameter, which indicates to UE 130, as well as other UEs in cell 110, a periodicity of sounding reference signal transmissions, as well as a subframe offset that specifies a subframe within a radio frame that should contain the sounding reference signal transmission. In addition, base station 112 can configure UE 130 with a UE-specific timing parameter that further defines a periodicity and subframe offset for transmission of SRS 132. In another example, base station 112 can configure UE 130 with a cell-specific and/or a UE-specific bandwidth parameter. The bandwidth parameter (e.g., cell-specific and/or UE-specific parameter) specifies a bandwidth for transmission of SRS 132. For instance, SRS bandwidth can be the frequency range in which SRS symbols are included. In an aspect, the UE-specific SRS bandwidth can be less than or equal to the cell-specific SRS bandwidth.

Yet another configurable parameter is a frequency hopping bandwidth, which can be established by base station 112. SRS bandwidth hopping enables UE 130 to transmit SRS 132 at different portions of the cell-specific SRS bandwidth over time (e.g., hop over the system bandwidth over time). In an example, UE 130 can be configured with a UE-specific SRS bandwidth that is less than the cell-specific SRS bandwidth. Accordingly, SRS bandwidth hopping, when enabled by base station 112, allows UE 130 to cycle SRS transmissions through the entire cell-specific SRS bandwidth or a portion thereof.

Further configurable parameters include a transmission comb, a starting physical resource block assignment, a duration of SRS transmission (e.g., single or indefinite), and/or a cyclic shift. The transmission comb parameter enables multiple UEs to simultaneously transmit sounding reference signals through assignment of disparate frequency shifts or comb. For instance, two UEs can transmit SRS symbols on every other frequency subcarrier and, moreover, the UEs are assigned different frequency shifts such that respective SRS symbols of each UE do not overlap on any given subcarrier. The cyclic shift parameters enables multiple UEs to simultaneously transmit sounding reference signals through utilization of varying phase rotations such that respective sounding reference signals are orthogonal.

In a multi-cell configuration, UE 130 can communicate with multiple base stations or cells (e.g., base stations 112 and 122) simultaneously to transmit and/or receive data. In one aspect, a multi-cell configuration can be a coordinated multi-point (CoMP) configuration wherein joint processing and/or coordinated scheduling/beamforming is employed. For example, in a joint processing CoMP configuration on the downlink, physical downlink shared channel (PDSCH) data (e.g., downlink user data) can be available at multiple points. PDSCH transmissions can be joint transmissions in which PDSCH data is transmitted from multiple points. In addition, PDSCH transmission can be based upon a dynamic cell selection scheme in which PSDCH data is transmitted from one point at a given time.

Turning to FIG. 1, a joint processing downlink CoMP configuration can be implemented by base stations 112 and 122, which comprise a CoMP cooperating set serving UE 130. The CoMP cooperating set includes a plurality of cells or base stations, potentially geographically separated, which coordinate to provide wireless communication services to a UE. In an example, base station 112 and 122 can coordinate to jointly transmit downlink data to UE 130 via wireless links 114 and 124, respectively. In another example, base station 112 and 122 can coordinate such that the base station having the greatest instantaneous channel quality transmits downlink data to UE 130.

Base stations 112 and 122 can further coordinate to implement scheduling and/or beamforming decisions. For instance, downlink data for UE 130 can be available at serving cell 110 (e.g., transmitted by base station 112), however, scheduling decisions impacting UE 130 account for information provided by other members of the CoMP cooperating set, such as base station 122. Base station 112 can schedule UE 130 to avoid potential downlink interference from transmissions in non-serving cell 120 and/or base station 112 can suppress transmissions in non-serving cell 120 based upon information provided by base station 122 via the backhaul 140.

It is to be appreciated that CoMP techniques can be applied on uplink transmissions in addition to downlink transmissions. For instance, base stations 112 and 122 can coordinate to receive uplink transmissions from UE 130 in a joint manner. In an example, base station 112 and base station 122 can receive an uplink data packet via wireless links 114 and 124, respectively. Base stations 112 and 122 can independently attempt to demodulate and decode the uplink packet. Base station 112 and/or base station 122 can exchange decoded data packets and employ packet combining to improve reliable reception of the uplink packet. In another aspect, base stations 112 and 122 can exchange information via the backhaul 140, wherein the exchanged information can be utilized to enhance scheduling decisions. For example, UE 130 can reside at a cell edge between serving cell 110 and non-serving cell 120. Base station 122 can provide information regarding UEs within the non-serving cell 120 and in proximity to UE 130. Base station 112 can utilize the information to schedule UE 130 on the uplink such that interference to/from neighboring cells is reduced.

To support CoMP operations, UE 130 can report feedback information to members of a CoMP reporting set. The CoMP reporting set can include all members of the CoMP cooperating set or a portion thereof. The feedback information can include explicit channel state information, implicit channel state information, and/or sounding reference signals which can be utilized for uplink scheduling and/or channel estimation via channel reciprocity. In accordance with an aspect, sounding reference signal transmissions can be configured with a set of parameters and transmit power can be controlled such that the sounding reference signal is received by members of a CoMP cooperating set with a reasonable carrier-to-interference ratio.

A variety of power control mechanisms can be employed for sounding reference signal transmissions. In one example, classic open loop power control can be implemented. The open loop mechanism can account for long term channel information of neighboring cells. In another example, a fixed sounding reference signal transmit power can be implemented. In yet another example, sounding reference signal power control can be de-coupled from PUSCH power control. For instance, sounding reference signal power control can be based on PUCCH power control. In another aspect, an additional sounding reference signal can be introduced for non-serving cells in a CoMP cooperating set.

In accordance with another aspect, PUSCH-based power control similar to LTE Release 8 can be employed, wherein an additional offset (e.g., a coordinated-multi-point offset (SRS CoMP offset)) is introduced to boost transmit power to enable the sounding reference signal to reach cells in the cooperating set. The SRS CoMP offset can be UE-specific and/or cell-specific, and configured dynamically (e.g., via layers 1 or 2) or semi-statically (e.g., via layer 3). A set of possible offset values can be determined, wherein the set can be based upon a size of the CoMP cooperating set. In another aspect, the set of possible values can be independent from the size of the cooperating set. Accordingly to an example, the offset can be zero when the size of the cooperating set is one. When the cooperating set includes two cells, the offset can be a value from a first set of possible values. When the cooperating set includes three or more cells, the offset can be selected from a second set of possible values. It is to be appreciated that the first and second sets can be configured by base station 112 and/or base station 122. According to another aspect, the SRS CoMP offset parameter can be combined with $P_{SRS\_OFFSET}$, as described above, instead of a separate parameter. For example, $P_{SRS\_OFFSET}$ for UE 130 can be configured such that additional transmit power to support CoMP operations is included.

In yet another aspect, base station 112 of serving cell 110 can identify an optimal value for the offset. According to an example, base station 112 can determine the optimal offset based upon UE channel characteristics relative to the serving cell 110 as well as non-serving cell 120. Base station 112 can ascertain the optimal offset based at least in part on uplink loading information in the serving cell 110 and/or the non-serving cell 120. In addition, base station 112 can factor CoMP cooperating set size when identifying the optimal offset. In addition, the additional offset can be based upon various parameters associated with cells in the cooperating set. For instance, the additional offset can be determined based upon long-term channel characteristics of a weakest cell in the cooperating set. Further, additional constraints such as a power or power spectral density (PSD) cap can be determined based upon an allocated SRS capacity (e.g., uplink control loading).

Base stations 112 and 122 can coordinate to configure transmission of SRS 132 by UE 130. In one example, UE 130 can transmit SRS 132 on separate uplink channels associated with wireless links 114 and 124. Accordingly, base stations 112 and 122 can independently configure UE 130 for respective uplink channels. In another example, UE 130 transmits SRS 132 on an uplink associated with serving cell 110. Accordingly, base station 112 configures UE 130 to transmit SRS 132 such that base station 122 reliably receives the transmission. Base station 112 can perform such configuration with or without information from base station 122 conveyed via the backhaul 140. While the above sounding reference signal designs have been described in connection with LTE-A, it is to be appreciated that 3GPP LTE, UMTS, CDMA, CDMA2000, HSPA, WCDMA, WiMAX, WiFi, and/or other technologies can utilize the concepts presented herein to configure reference signals transmitted to one or more cells in a coordinated multipoint configuration.

Figure 2:
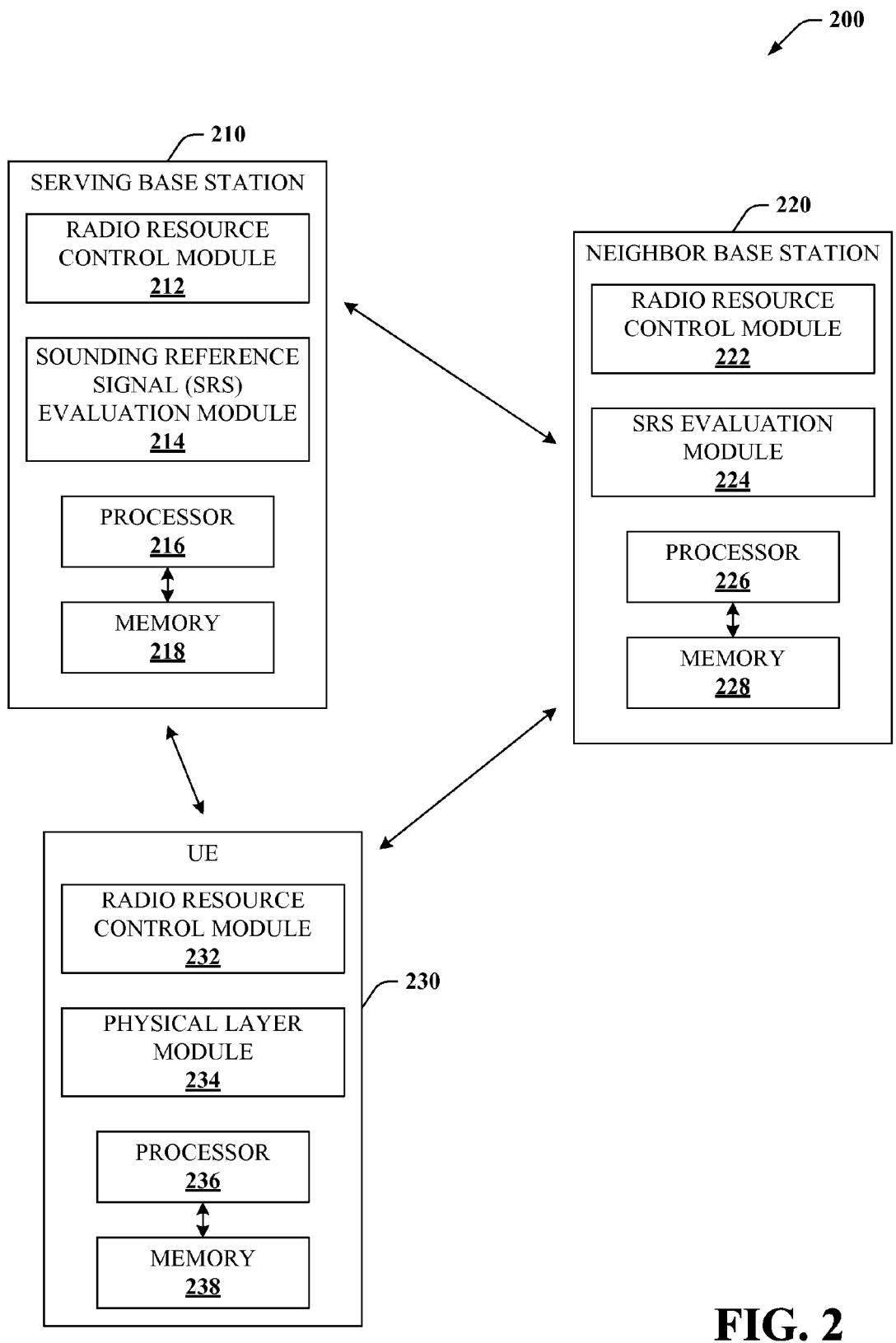
FIG. 2 is an illustration of an example system that facilitates utilizing sounding reference signals in a coordinated multi-point configuration in accordance with various aspects.

Referring to FIG. 2, a system 200 is illustrated that facilitates utilizing sounding reference signals in a coordinated multi-point configuration in accordance with various aspects. System 200 can include a serving base station 210, which can be similar to and perform similar functionality as base station 112 described above with respect to FIG. 1. Serving base station 210 can receive uplink signaling and uplink data transmission from one or more mobile devices, such as UE 230. In addition, serving base station 210 can transmit downlink signaling to one or more mobile devices. System 200 can further include a neighbor base station 220, which can be similar to and perform similar functionality as base station 122 described supra. In an aspect, serving base station 210 and neighbor base station 220 can be included in a CoMP cooperating set relative to UE 230. Accordingly, serving base station 210 and neighbor base station 220 can coordinate to transmit downlink data to UE 230 and/or to receive uplink data from UE 230. UE 230 can transmit a sounding reference signal (SRS) to serving base station 210 and/or neighbor base station 220. The sounding reference signal enables estimation of an uplink channel to facilitate uplink power control, uplink link adaptation, time tracking, adaptive uplink antenna switching, and/or downlink link adaption and scheduling through channel reciprocity.

Serving base station 210 and neighbor base station 220 can respectively include radio resource control (RRC) modules 212 and 222, which implement functions associated with an RRC protocol. For example, RRC modules 212 and 222 can implement broadcasting of system information, connection control, paging, establishment and configuration of connections, quality of service (QoS) control, radio link failure recovery, and/or other similar functions. In accordance with an aspect, RRC modules 212 and/or 222 can convey configuration information to UE 230, wherein the configuration information relates to transmission of SRS. The configuration information can be incorporated into layer 3 messaging associated with establishing a connection transmitted during connection setup and/or incorporated into reconfiguration messaging transmitted at any time.

Serving base station 210 and neighbor base stations 220 can include SRS evaluation modules 214 and 224, respectively. The SRS evaluation modules 214 and 224 can receive an SRS transmission from UE 230, analyze the SRS, and generate channel estimates or other information. The generated channel estimates can facilitate uplink and/or downlink scheduling of at least UE 230. In addition, the channel estimates can facilitate coordination between serving base station 210 and neighbor base stations 220 while implementing CoMP on the downlink or uplink.

UE 230 can include an RRC module 232 that receives layer 3 messages from serving base station 210 and/or neighbor base station 220. The layer 3 messages can include configuration information determined by RRC modules 212 and/or 222. The RRC module 232 can configure a physical layer module 234 to transmit SRS based at least in part on the configuration information. The physical layer module 234 can perform coding, modulation, multi-antenna processing, and/or mapping of a signal to appropriate physical time-frequency resources. In addition, the physical layer module 234 can generate physical signals, such as sounding reference signals, incorporate the physical signals into a subframe, and transmit the subframe on an uplink.

To support CoMP operations, SRS transmitted by UE 230 can be configured such that the SRS is reliably received by members of a cooperating set, which can include serving base station 210, neighbor base station 220, and/or any other base stations (not shown) cooperatively providing wireless communication services to UE 230. In addition, transmit power of the SRS transmission can be controlled to enable the SRS transmission to be received by cells within the cooperating set while regulating interference levels.

In an aspect, UE 230 can receive downlink data from serving base station 210 and/or neighbor base station 220 during CoMP operation. For instance, UE 230 can receive downlink data jointly transmitted by serving base station 210 and/or neighbor base station 220. In another example, UE 230 can receive downlink data from serving base station 210, while neighbor base station 220 and serving base station 210 coordinate to avoid or suppress interference from transmissions in neighbor cells. In one aspect, UE 230 can utilize separate uplinks provided by serving base station 210 and neighbor base station 220, respectively. Accordingly, serving base station 210 and neighbor base station 220 can independently configure UE 230 to transmit SRS on each uplink. However, in an aspect, UE 230 utilizes a single uplink served by serving base station 210 while receiving data on multiple downlinks from multiple points. In such cases, the SRS transmitted by UE 230 is conveyed on an uplink provided by serving base station 210 and is indirectly received by neighbor base station 220. In a single uplink instance, serving base station 210 and neighbor base station 220 can coordinate to configure SRS transmissions and/or control transmit power.

According to an example, RRC module 212 of serving base station 210 can transmit a configuration message to UE 230. The configuration message can include configuration information such as a plurality of parameters that influence SRS transmission. Similarly, RRC module 214 of neighbor base station 220 can also transmit a configuration message to UE 230 that contains a second set of parameters for the SRS transmission. RRC module 232 of UE 230 can integrate disparate parameters from the individual configuration messages to configure the physical layer module 234 to transmit the SRS.

In another example, RRC module 212 of serving base station 210 can supply all configuration information to UE 230 in one or more RRC messages. In generating the configuration information, serving base station 210 and neighbor base station 220 can exchange cell information via a backhaul. The cell information can relate to cell loading, channel estimates, scheduling information, interference levels, and the like. RRC module 212 can generate the configuration information based at least in part on exchanged cell information such that the SRS transmission is reliably received by the neighbor base station 220 and any other members of the cooperating set.

As further illustrated in system 200, serving base station 210 can include a processor 216 and/or a memory 218, which can be utilized to implement some or all the functionality of RRC module 212, SRS evaluation module 214, and/or other functionality of serving base station 210. Similarly, FIG. 2 illustrates that neighbor base station 220 can include a processor 226 and memory 228 to implement functionality of neighbor base station 220, such as functionality of RRC module 222 and/or SRS evaluation module 224. Moreover, UE 230 includes a processor 236 and a memory 238 to implement functionality of UE 230, RRC module 232, and/or physical layer module 234.

Figure 3:
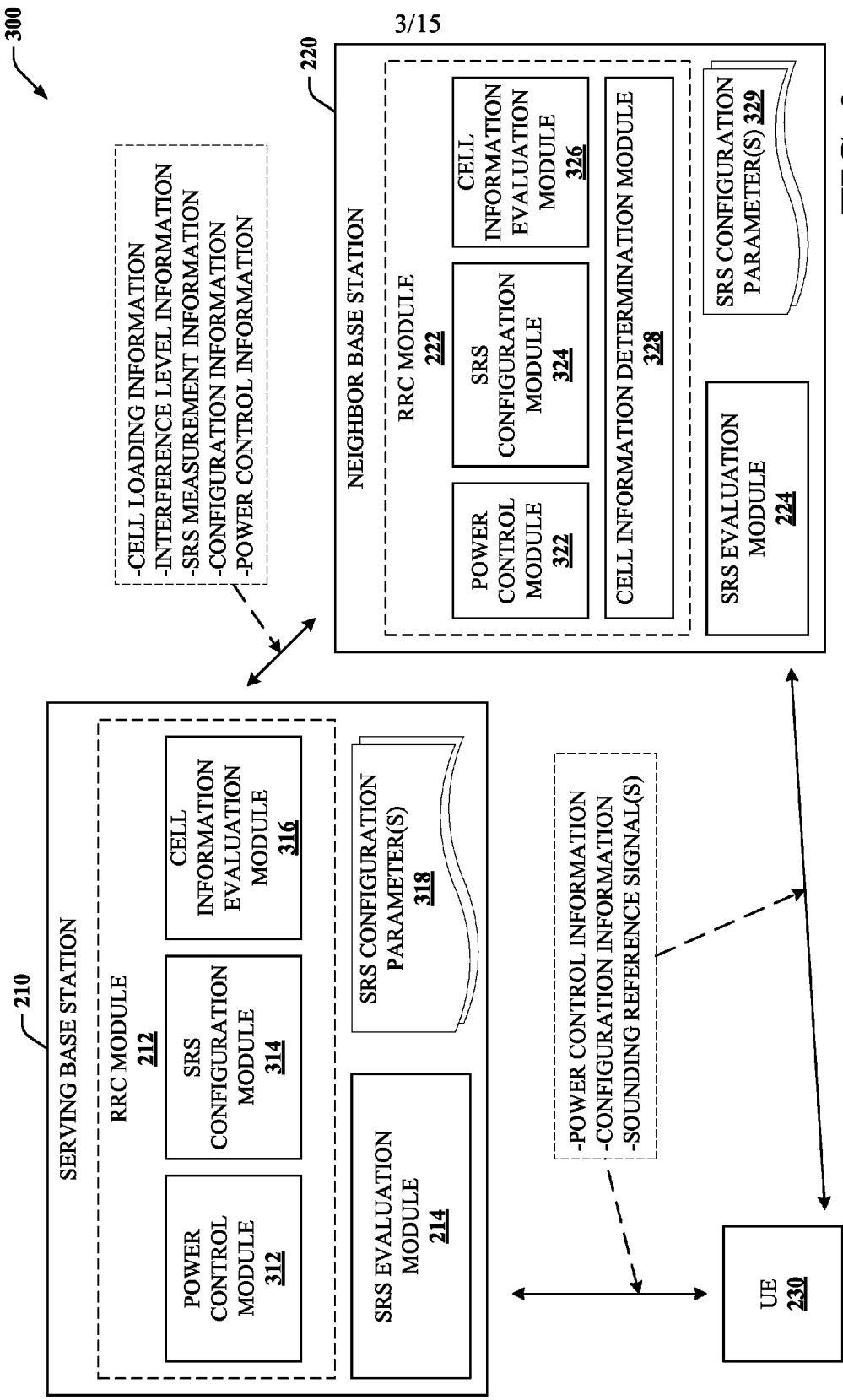
FIG. 3 is an illustration of an example system that facilitates configuration and power management of sounding reference signals according to various aspects.

Turning next to FIG. 3, a system 300 is illustrated that facilitates configuration and power management of sounding reference signals according to various aspects. System 300 can include a serving base station 210, neighbor base station 220, and UE 230, which can be similar to and perform similar functionality as serving base station 210, neighbor base station 220, and UE 230 described above with respect to FIG. 2. In addition to transmitting downlink data to UE 230, serving base station 210 and/or neighbor base station 220 can provide power control information and configuration information to UE 230 via one or more downlinks. Further, UE 230 can transmit a sounding reference signal (SRS) to serving base station 210 and neighbor base station 220 via one or more uplinks. In an aspect, UE 230 can be configured to utilize coordinated multi-point (CoMP) transmission or reception. For example, serving base station 210 and neighbor base station 220, as members of a cooperating set, can coordinate to jointly transmit downlink data to UE 230, or to suppress or avoid interference from downlink transmission to UE 230. In addition, serving base station 210 and neighbor base station 220 can jointly receive uplink data transmissions.

Serving base station 210 can include a power control module 312 that generates power control configuration parameters and/or power control commands which can be signaled to UE 230 to establish transmit power of the SRS. Serving base station 210 can further include an SRS configuration module 314 that generates a set of configuration parameters 318 that influence SRS transmission by UE 230. In addition, serving base station 316 can include a cell information evaluation module 316 that receives and analyzes information provided by other cells in the cooperating set over a backhaul. Similarly, neighbor base station 220 can include a power control module 322, an SRS configuration module 324 that generates SRS configuration parameters 329, and a cell information evaluation module 326. Further, neighbor base station 220 can include a cell information determination module 328 that identifies cell information of a cell associated with neighbor base station 220. The cell information can include cell loading information, interference level information (e.g., from intra-cell and/or inter-cell interference), SRS measurement information, other link measurements, channel estimates, configuration information, power control information, and the like.

To support CoMP operations, UE 230 can transmit SRS such that members of a cooperating set reliably receive the SRS. For example, the cooperating set can include serving base station 210 and neighbor base station 220 coordinating to provide UE 230 with CoMP on the downlink and/or uplink. The SRS can be evaluated by SRS evaluation modules 214 and 224 to generate channel estimates of the uplink. Such channel estimates can be employed for uplink scheduling as well as downlink scheduling when channel reciprocity can be exploited. In an aspect, SRS transmissions can be configured by members of the cooperating set to enable deep penetration of SRS to members of the cooperating set. In addition, transmit power can be controlled by members of the cooperating set to improve accurate receipt of SRS while minimizing interference.

In one example, UE 230 can receive downlink transmissions on separate downlinks associated with serving base station 210 and neighbor base station 220. Accordingly, UE 230 can obtain configuration information and power control information independently from both stations. In another example, UE 230 can receive configuration information and power control information explicitly from a serving cell (e.g., serving base station 210), while similar information is implicitly received from neighbor cells (e.g., neighbor base station 220). For instance, serving base station 210 can explicitly signal configuration information and power control commands to UE 230, wherein the configuration information and power control commands are generated in part on data provided by neighbor base station 220 to serving base station 210 over the backhaul.

Pursuant to this example, SRS configuration module 314 can generate a set of SRS configuration parameters 318, which can be signaled as configuration information to UE 230 via an RRC message during connection setup and/or connection reconfiguration. Serving base station 210 can maintain a plurality of sets of SRS configuration parameters, wherein each set is associated with a UE being served. The set of SRS configuration parameters 318 can include parameters such as a cell-specific and UE-specific SRS bandwidth, a cell-specific and UE-specific transmission periodicity and subframe offset, a SRS hopping bandwidth and/or pattern, a transmission comb, a starting physical resource block assignment, a SRS transmission duration, a cyclic shift, an SRS transmit power offset, and the like.

SRS configuration module 314 can generate the set of SRS configuration parameters 318 based in part on cell information from neighbor cells analyzed by cell information evaluation module 316. For example, SRS configuration module 314 can utilize cell information from neighbor cells to identify periodicity and subframe offset parameters such that interference generated by SRS transmissions matches interference generated by downlink transmissions in the cooperating set. In addition, SRS configuration module 314 can generate transmission instance parameters (e.g., periodicity and subframe offset) to facilitate mutually orthogonal SRS transmission among cells in the cooperating set. For instance, based upon the number of UEs utilizing CoMP and/or the CoMP cooperating set for each UE, involved cells can decide to employ identical cell-specific periodicities but disparate offsets to achieve orthogonality among SRS transmissions from the UEs. Accordingly, SRS configuration module 314 can select a periodicity and offset for UE 230 such that SRS transmissions from UE 230 are orthogonal to SRS transmissions from UEs in neighbor cells.

When setting bandwidth and/or hopping parameters in the set of SRS configuration parameters 318, SRS configuration module 314 can consider various factors. In an example, CoMP operations are increasingly beneficial to UEs having large assignments and/or chunks of data to justify additional overhead associated with CoMP. In addition, CoMP gains can be effectively realized in heterogeneous deployments (e.g., with closed subscriber group cells) where assignment bandwidth can be large due to a limited number of UEs served. Given these considerations, SRS configuration module 314 can generate SRS bandwidths parameters that enable UE 230 to transmit SRS over a large portion of system bandwidth. In another example, SRS bandwidth can be only a part of the system bandwidth. For instance, when downlink bandwidth is less than uplink bandwidth and/or UE 230 is expected to be scheduled with low bandwidth, a smaller SRS bandwidth can be configured.

In another aspect, SRS configuration module 314 can generate configuration parameters that enable a large portion of system bandwidth to be sounded while configuring a relatively small SRS bandwidth. For example, in a system having a 20 MHz bandwidth, SRS configuration module 314 can generate an SRS bandwidth of 5 MHz, but further instruct UE 230 to perform frequency hopping such that, over time, the 5 MHz SRS bandwidth covers the 20 MHz system bandwidth. It is to be appreciated that the 5 MHz portions utilized for SRS transmission at any given instance need not be contiguous.

According to an additional aspect, SRS configuration module 314 can generate configuration information that enables UE 230 to sound an entire system bandwidth via partitioning mechanisms. In an example, system bandwidth can be organized into a plurality of chunks (e.g., four 5 MHz chunks for a 20 MHz system bandwidth). Each chunk or partition can be equal in size or each chunk can have disparate sizes. SRS configuration module 314 can activate SRS hopping on two levels, inter-chunk hopping and intra-chunk hopping. SRS hopping can be performed over different chunks over time. Within each chunk, SRS can be transmitted utilizing a portion of the chunk, wherein SRS hops to different portions within the chunk over time. In an aspect, one or more cycles can be completed within a chunk before hopping to a subsequent chunk, wherein the one or more cycles can be predetermined. It is to be appreciated that different chunks can be configured to include disparate numbers of cycles. For instance, a chunk can span an important portion of system bandwidth such that sounding information for that portion occurs more often. To cycle the system bandwidth, a total number of hops can be given by:

$$K*L*\text{sum}(M_1, \ldots, M_L)$$

Where K is a number of chunks, L is a ratio between chunk bandwidth and SRS bandwidth for a given transmission instance, and $M_i$ represents a number of full cycles within the ith chunk. SRS configuration module 314 can configure the number of full cycles, $M_i$, as well as the partitioning mechanism on a per-cell or per-UE basis. SRS configuration module 314 can determined the number of cycles and/or partitioning mechanisms based in part on uplink channel information, UE distributions within a cell, and the like. Such information can be associated with the serving cell (e.g., known by serving base station 210) and/or associated with neighboring cells (e.g., provided via the backhaul by neighbor base station 220).

Serving base station 210 can effectuate SRS power control via semi-static parameters as well as dynamic power control commands. In accordance with an aspect, SRS configuration module 314 can establish SRS power offset parameters employed to set transmit power of SRS during CoMP operations. SRS configuration module 314 can establish a plurality of groups of offset values, wherein each group of values is associated with a particular cooperating set size. In another example, SRS configuration module 314 can select an optimal offset based upon channel characteristics, cell loading information, cooperating set size, or the like. Further, power control module 312 can monitor and evaluate received SRS transmissions to identify if closed-loop power adjustments are required. Such closed-loop power adjustments can be power commands (e.g., up or down) that increase or decrease transmit power by an increment. Power control module 312 can generate power control commands based in part on cell information received from neighbor base station 220 by cell information evaluation module 316. For example, neighbor base station 220 can provide channel characteristics, loading information, interference information and/or preferred power configurations to power control module 312.

Neighbor base station 220 can include a power control module 322 which can generate power control commands. The power control commands can be signaled to UE 230 via downlink control information and/or provided via the backhaul to serving base station 210. In addition, neighbor base station 220 includes SRS evaluation module 324 that generates a set of SRS configuration parameters 329 associated with UE 230. In an aspect, neighbor base station 220 transmits the set of parameters 329 to UE 230 as configuration information in one or more RRC messages. According to another example, neighbor base station 220 conveys the set of SRS configuration parameters 329 to serving base station 210 which considers the set of parameters 329 when configuring UE 230.

Figure 4:
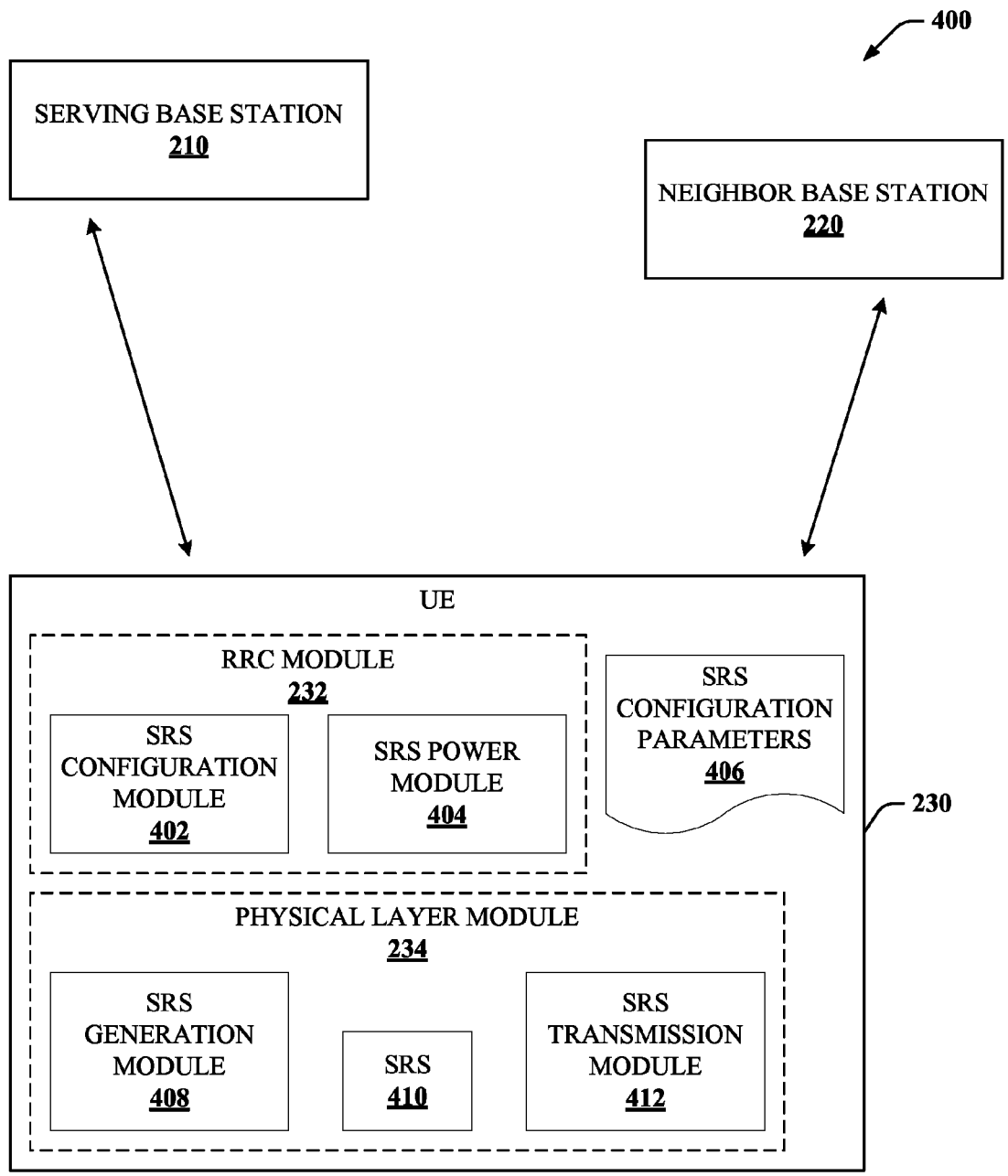
FIG. 4 is an illustration of an example system that facilitates configuration and transmission of a sounding reference signal during coordinated multi-point operation in accordance with one or more aspects.

Turning now to FIG. 4, a system 400 is depicted that facilitates configuration and transmission of a sounding reference signal during CoMP operation in accordance with one or more aspects. System 400 can include a UE 230, which can be similar to and perform similar functionality as UE 230 described above with reference to previous figures. UE 230 can be configured to utilize CoMP to transmit data and/or receive data to/from a cooperating set including serving base station 210 and neighbor base station 220. To support CoMP operation, UE 230 can transmit a sounding reference signal (SRS) to members of the cooperating set. SRS can be transmitted on an uplink supported by one member of the cooperating set, for instance, serving base station 210. Accordingly, SRS transmission on UE 230 can be configured such SRS, transmitted on one uplink, is reliably received by other members of the cooperating set.

In accordance with an aspect, UE 230 can include an RRC module 232 that receives RRC messages from serving base station 210 and/or neighbor base station 220. The RRC messages can include configuration information comprising a set of SRS configuration parameters. In addition, the RRC module 232 can receive power control commands from serving base station 210 and/or neighbor base station 220. RRC module 232 can employ the configuration information and power control commands to configure SRS transmission of a physical layer module 234.

RRC module 232 can include an SRS configuration module 402 that evaluates received configuration information from one or members of the cooperating set to generate a set of SRS configuration parameters 406. The set of SRS configuration parameters 406 can include parameters such as a cell-specific and UE-specific SRS bandwidth, a cell-specific and UE-specific transmission periodicity and subframe offset, a SRS hopping bandwidth and/or pattern, a transmission comb, a starting physical resource block assignment, a SRS transmission duration, a cyclic shift, an SRS transmit power offset, and the like. SRS configuration module 402 can utilize the set of SRS configuration parameters 406 to control SRS generation and transmission the physical layer module 234.

In an aspect, UE 230 can receive disparate configuration information from different members of the cooperating set. For instance, UE 230 can receive first configuration information having a first set of SRS configuration parameters from serving base station 210 and second configuration information having a second set of SRS configuration parameters from neighbor base station 220. In one example, SRS configuration module 402 can integrate and reconcile the first and second configuration information to generate the set of SRS configuration parameters 406. In another example, SRS configuration module 402 can utilize the first and second configuration information separately to independently configure two SRS transmissions. For instance, SRS configuration module 402 can utilize the first configuration information to configure SRS transmissions to serving base station 210 and employ the second configuration information to transmit SRS to neighbor base station 220.

RRC module 232 can include an SRS power module 404 that regulates transmit power associated with SRS. In one aspect, SRS power module 404 can employ a PUSCH-based power control mechanism that includes an open-loop component and a closed-loop component. For instance, SRS power module 404 can establish a transmit power according to the following:

$$P_{SRS}(i) = \min\{P_{CMAX}, P_{SRS\_OFFSET} + 10\log_{10}(M_{SRS}) + P_{O\_PUSCH}(j) + \alpha \cdot PL + f(i)\}$$

Pursuant to this example, $P_{SRS\_OFFSET}$ is a UE-specific configuration parameter that provides an additional power offset for sounding reference signals above PUSCH transmissions and can be included in configuration information signaled to UE 230. To support CoMP, an additional offset parameter, SRS CoMP offset, can be introduced. The additional offset can be added to SRS transmit power so long as the transmit power does not exceed a maximum transmit power of UE 230. The additional offset, SRS CoMP offset, can be included in configuration information signaled to UE 230 and retained in the set of SRS configuration parameters 406. The set of SRS configuration parameters 406 can include a plurality of groups of offset values wherein each group is associated with a cooperating set size. Accordingly, SRS power module 404 selects a group from the plurality of groups based upon the size of the cooperating set and selects a value from within the group to boost SRS transmit power. In another aspect, the set of SRS configuration parameters 406 can include an optimal offset value selected by serving base station 210 and/or neighbor base station 220. In addition, SRS CoMP offset can be incorporated into a configured value for $P_{SRS\_OFFSET}$.

SRS power module 404 further adjusts SRS transmit power (e.g., incrementally increasing or decreasing transmit power) based upon power control commands received from serving base station 210 and/or neighbor base station 220. In one example, SRS power module 404 utilizes power control commands received from serving base station 210, wherein the power control commands are generated based, in part, on information exchanged between serving base station 210 and neighbor base station 220. In another example, SRS power module 404 can obtain power control commands issued from both serving base station 210 and neighbor base station 220. In such cases, SRS power module 404 can employ a variety of mechanisms to combine the power control commands when setting SRS transmit power of UE 230.

It is to appreciated that SRS power module 404 can employ other techniques to regulate SRS transmit power of UE 230. For example, classic open loop power control can be implemented, wherein the open loop mechanism accounts for long term channel information of neighboring cells. In another example, SRS power module 404 can establish a fixed SRS transmit power. In addition, SRS power module 404 can employ PUCCH-based power control.

Physical layer module 234 can include an SRS generation module 408 that produces an SRS sequence 410. In one example, SRS generation module 408 can generate a constant amplitude zero auto-correlation (CAZAC) waveform signal, such as a Zadoff-Chu sequence, to be employed as SRS 410. SRS generation module 408 can create SRS 410 in accordance with one or more parameters in the set of SRS configuration parameters 406. For instance, SRS generation module 408 can generate a signal in accordance with an SRS bandwidth, cyclic shift, and/or any other parameters included in the set of SRS configuration parameters 406. Physical layer module 234 can also include a SRS transmission module 412 that transmits SRS 410 in accordance with one or more parameters in the set of configuration parameters 406. For example, SRS transmission module 412 can integrate SRS 410 into a subframe specified by a subframe offset in accordance with a configured periodicity. In addition, the SRS transmission module 412 maps SRS 410 to resource elements in accordance with SRS bandwidth and hopping parameters, transmission comb parameters, starting assignments, and the like.

Referring to FIGS. 5-9, methodologies are described related to facilitating sounding reference signal configuration and transmission to support coordinated multi-point reception or transmission. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 5:
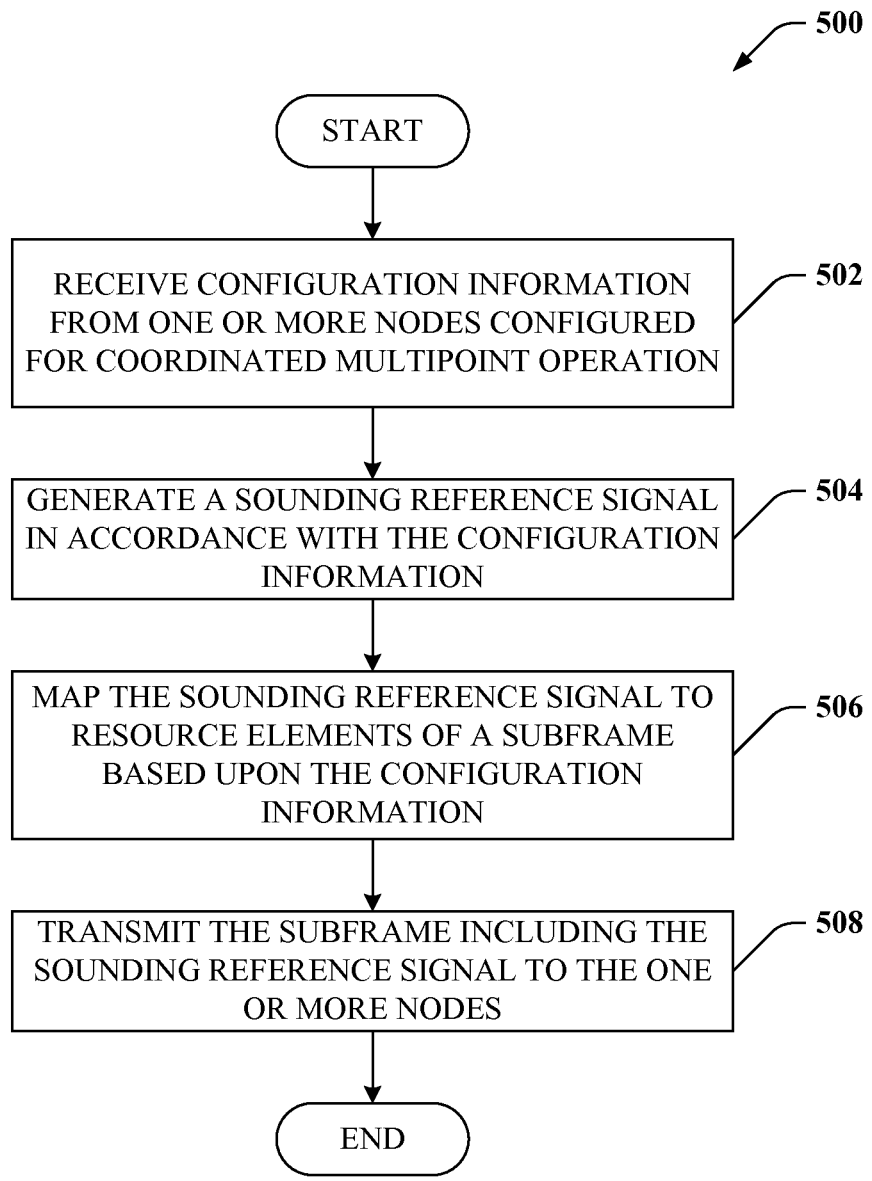
FIG. 5 is an illustration of an example methodology for configuring sounding reference signal transmissions to support coordinated multi-point operations in accordance with various aspects.

Turning to FIG. 5, illustrated is a method 500 for configuring sounding reference signal transmissions to support coordinated multi-point transmission or reception in accordance with various aspects. Method 500 can be employed, for example, by a mobile device to facilitate transmission of sounding reference signals that can support coordinated multi-point (CoMP) operation. At reference numeral 502, configuration information can be received from one or more nodes in a cooperating set in which the nodes in the cooperating set collaborate to effectuate CoMP operations. In an aspect, configuration information can be received from multiple nodes within in the cooperating set and combined. Integrating the configuration from multiple nodes can be effectuated by a variety of heuristics that reconcile inconsistencies and/or conflicts. In another example, configuration information can be obtained from a serving node within the cooperating set. Configuration information can include a set of parameters associated with sounding reference signal (SRS) transmission. The set of parameters can include parameters such as, but not limited to, a bandwidth parameter, a periodicity parameter, a subframe offset, a hopping bandwidth parameter, a transmission comb parameter, a starting physical resource block assignment, a transmission duration parameter, a cyclic shift parameter, a transmit power offset (e.g., an SRS transmit power offset), a coordinated multi-point offset (e.g., an SRS CoMP offset), and the like. In addition, each parameter in the set of parameter can be cell-specific and/or UE-specific.

At reference numeral 504, a sounding reference signal can be generated in accordance with the configuration information. At 506, the sounding reference signal can be mapped to resource elements of a subframe based upon the configuration information. At 508, the subframe that includes the sounding reference signal can be transmitted to one or more nodes in the cooperating set.

Figure 6:
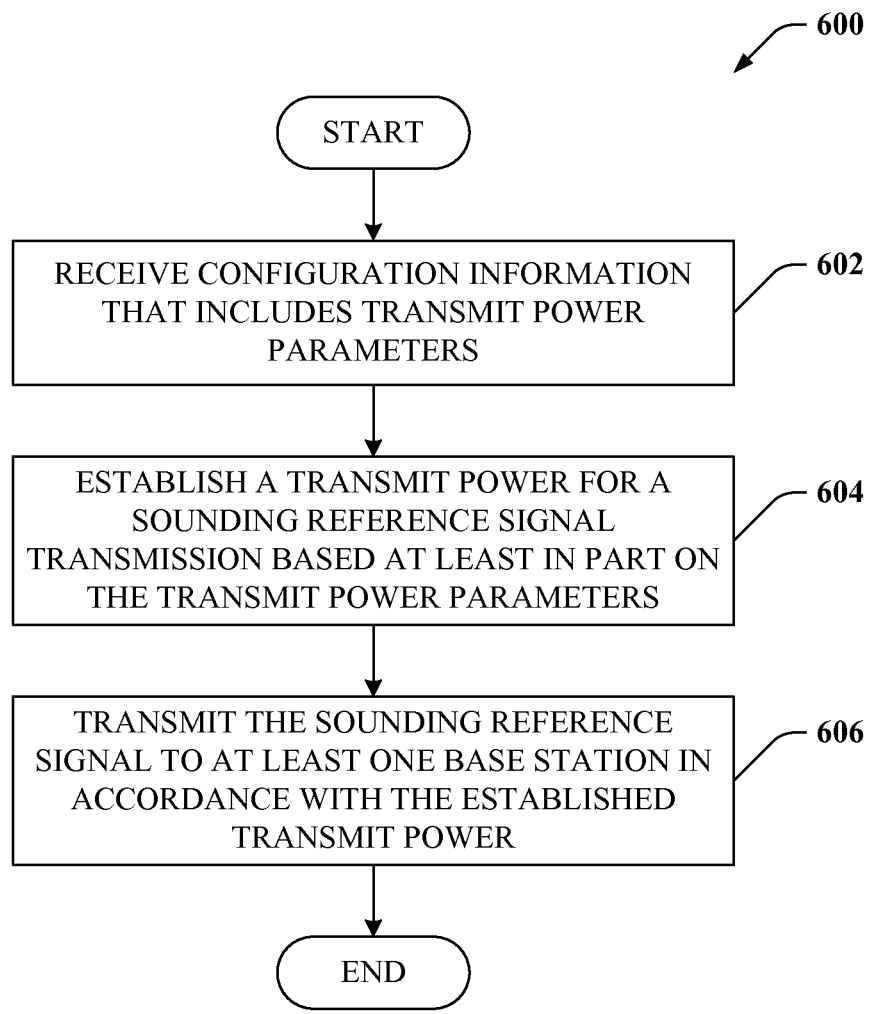
FIG. 6 is an illustration of an example methodology for setting a transmit power for a sounding reference signal according to various aspects.

Referring now to FIG. 6, a method 600 is depicted that facilitates setting a transmit power for a sounding reference signal according to various aspects. Method 600 can be employed, for instance, by a mobile device configured to employ CoMP transmission and/or reception. Method 600 can commence at reference numeral 602 where configuration information related to sounding reference signal (SRS) transmissions is received. The configuration information can include transmit power parameters such as an SRS transmit power offset parameter and an SRS CoMP transmit power offset parameter. The SRS CoMP transmit power offset parameters can include sets of offset values, wherein disparate sets of offsets values are associated with different sizes of a cooperating set (e.g., cells collaborating as a part of a CoMP operation). In another example, the SRS CoMP transmit power offset parameter can be optimal offset value determined by a serving cell or other cell in the cooperating set. Moreover, the SRS CoMP transmit power offset parameter can be incorporated into the SRS transmit power offset parameter.

At reference numeral 604, a transmit power for a SRS transmission can be established based, at least in part, on the transmit power parameters. In an example, the transmit power can be based transmit power of a physical uplink shared channel (PUSCH) with additional offsets (e.g., the SRS transmit power offset and/or the SRS CoMP transmit power offset) applied to boost SRS transmit power over PUSCH transmit power. At reference numeral 606, the sounding reference signal can be transmitted to at least one base station within the cooperating set. The sounding reference signal can be transmitted in accordance with the established transmit power.

Figure 7:
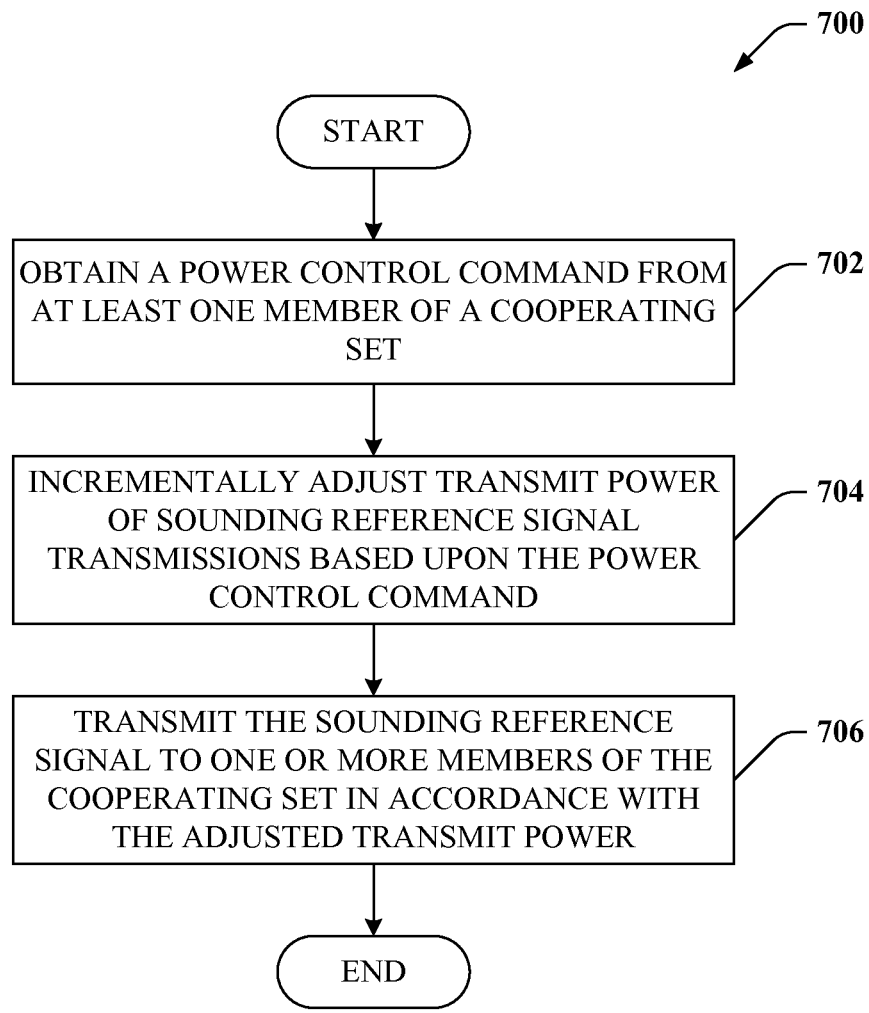
FIG. 7 is an illustration of an example methodology for adjusting a transmit power for a sounding reference signal in accordance with various aspects.

FIG. 7 illustrates a method 700 for adjusting a transmit power for a sounding reference signal in accordance with various aspects. At reference numeral 702, a power control command is obtained from at least one member of a CoMP cooperating set. According to one aspect, the power control command is received from a serving cell within the cooperating set. In another aspect, two or more power control commands are received from a plurality of cells within the cooperating set. At reference numeral 704, transmit power of sounding reference signal transmissions can be incrementally adjusted based upon the power control command. In the case of two or more power control commands being received, the commands can be combined to adjust the transmit power. At reference numeral 706, the sounding reference signal can be transmitted to one or more members of the cooperating set in accordance with the adjusted transmit power.

Figure 8:
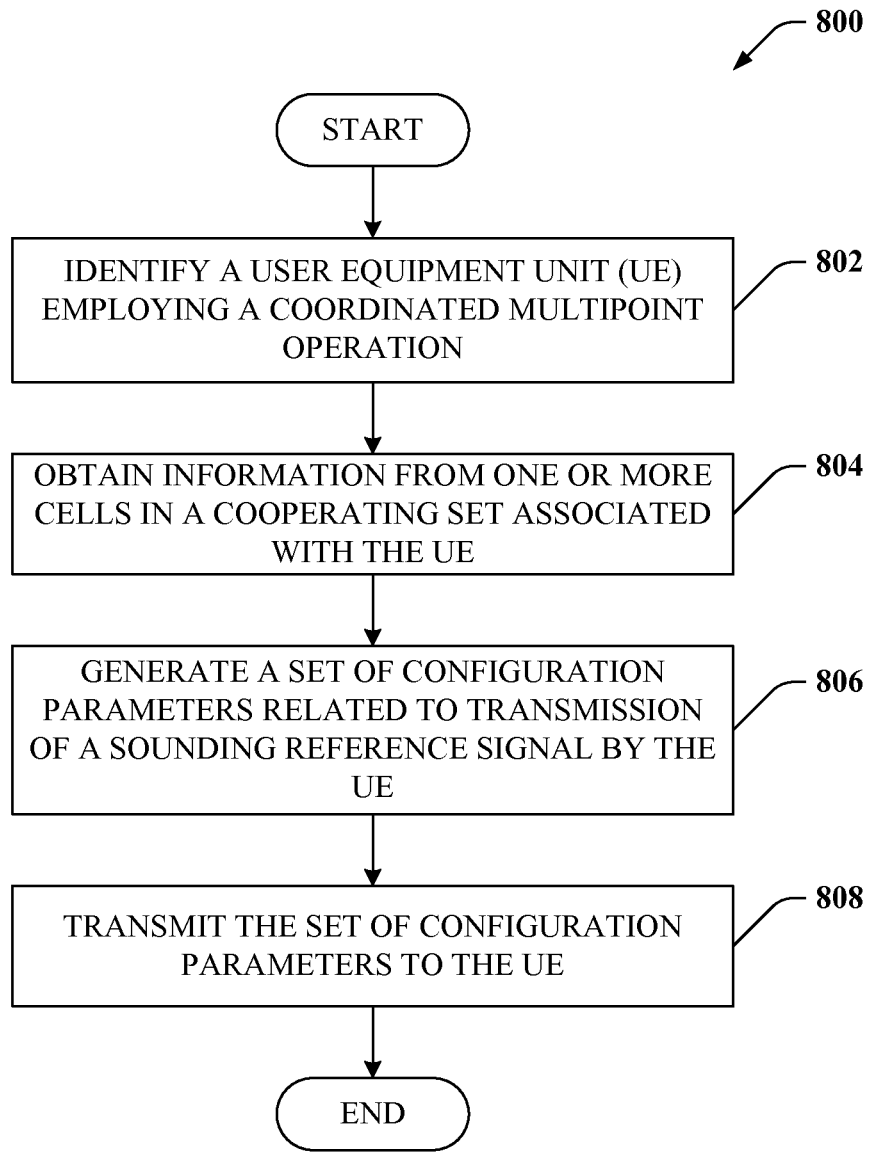
FIG. 8 is an illustration of an example methodology for generating sounding reference signal configuration information applicable to support coordinated multi-point operation in accordance with various aspects.

Referring now to FIG. 8, a method 800 is depicted for generating sounding reference signal configuration information applicable to support coordinated multi-point operation in accordance with various aspects. Method 800 can be employed, for example, by a base station within a cooperating set of a mobile device. At reference numeral 802, a UE employing coordinated multi-point (CoMP) reception and/or transmission is identified. At reference numeral 804, information is obtained from one or more neighbor cells within the cooperating set associated with the identified UE. The information obtained from neighbor cells can include cell loading information, interference level information (e.g., from intracell and/or inter-cell interference), SRS measurement information, other link measurements, channel estimates, configuration parameters, power control information, and/or any other information applicable when rendering configuration decisions that support CoMP operation.

At reference numeral 806, a set of configuration parameters related to transmission of SRS can be generated. In an aspect, the set of configuration parameters can be generated based, at least in part, on the information obtained from neighbor cells. At reference numeral 808, the set of configuration parameters can be transmitted to the UE. The parameters can be transmitted as configuration information included in one or more RRC messages, for example.

Figure 9:
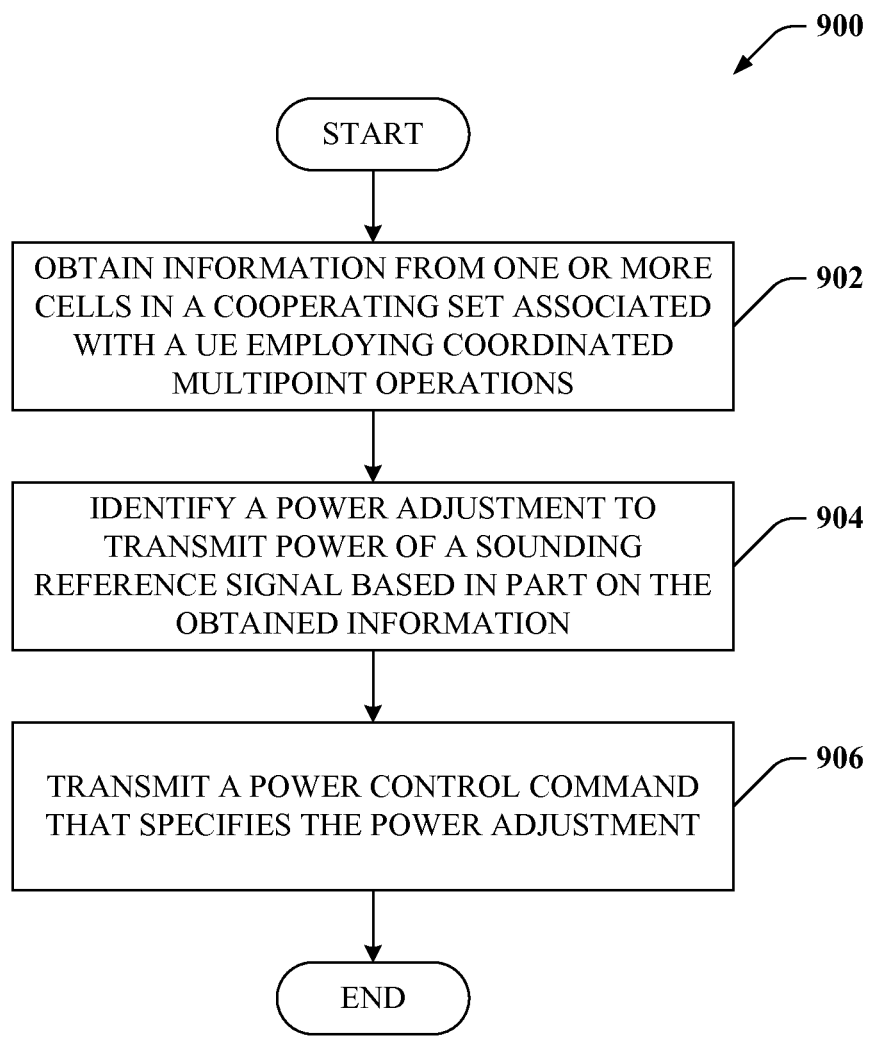
FIG. 9 is an illustration of an example methodology for determining power adjustments of sounding reference signal transmissions according to various aspects.

FIG. 9 depicts a method 900 for determining power adjustments of sounding reference signal transmissions according to various aspects. Method 900 can be employed, for example, by a base station within a cooperating set providing CoMP transmission and/or reception to a UE. At reference numeral 902, information is obtained from one or more cells in a cooperating set associated with a UE. The cells within the cooperating set collaborate to provide coordinate multi-point (CoMP) transmission and/or reception to the UE. At reference numeral 904, a power adjustment is identified, wherein the power adjustment relates to transmit power of a sounding reference signal transmission by the UE. In an aspect, the power adjustment is identified based, in part, on the information obtained from the cells in the cooperating set. According to an example, the information obtained from other cells can include power commands preferred by other cells. In addition, the information can include loading information, link characteristics, channel quality metrics, interference levels, etc. At reference numeral 906, a power control command specifying the power adjustment can be transmitted to the UE. In an example, the power control command can be included in downlink control information.

It will be appreciated that, in accordance with one or more aspects described herein, inferences can be made regarding selecting SRS configuration parameters, evaluating cell information, issuing power control commands, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
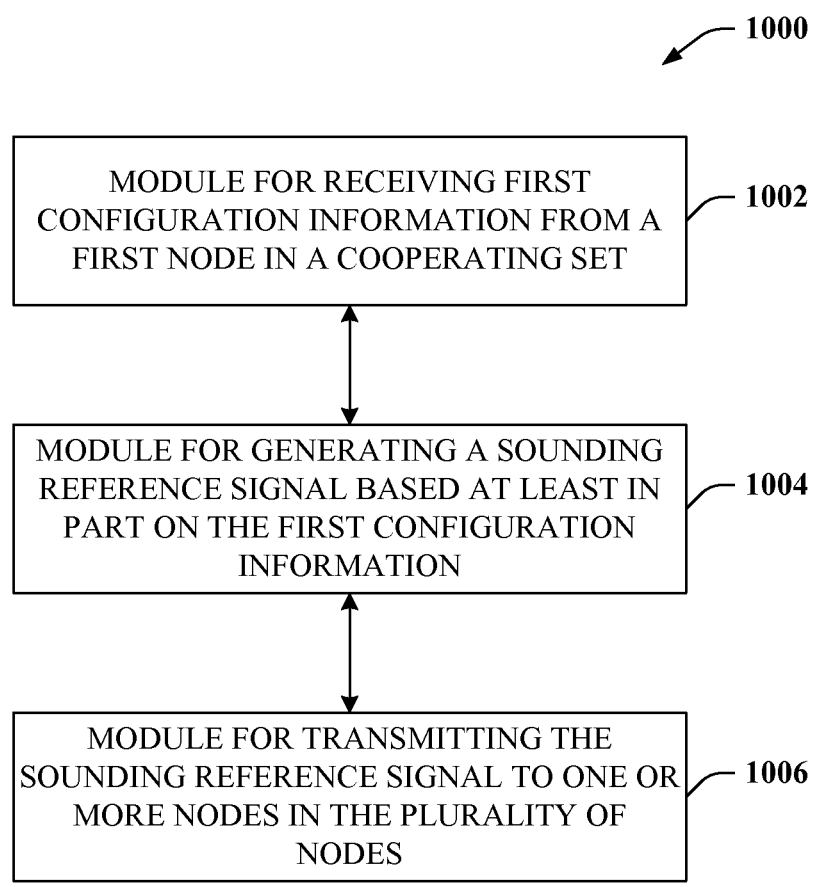
FIG. 10 is an illustration of an example apparatus that facilitates sending a sounding reference signal to one or more nodes in a cooperating set in accordance with various aspects.

Referring next to FIG. 10, an apparatus 1000 that facilitates transmitting a sounding reference signal to one or more nodes in a cooperating set is illustrated. It is to be appreciated that apparatus 1000 is represented as including functional blocks, which can be functional blocks that represent functions implemented by a processor, software, or combination thereof (e.g., firmware). Apparatus 1000 can be implemented by a user device (e.g., UE 130, UE 230, etc.) and/or any other suitable network entity and can include a module 1002 for receiving first configuration information from a first node in a cooperating set, a module 1004 for generating a sounding reference signal based at least in part on the first configuration information, and a module 1006 for transmitting the sounding reference signal to one or more nodes in the plurality of nodes.

Figure 11:
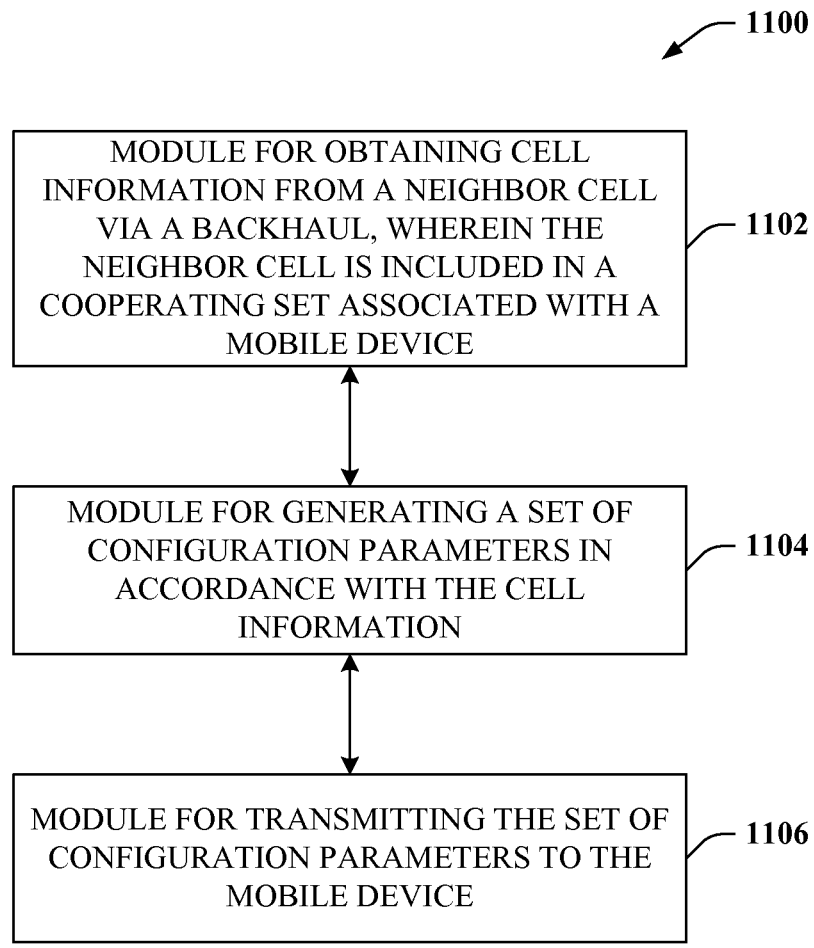
FIG. 11 is an illustration of an example apparatus that facilitates configuration of sounding reference signal transmissions that support coordinated multi-point reception and/or transmission.

Referring next to FIG. 11, an apparatus 1100 that facilitates configuration of sounding reference signal transmissions that support coordinated multi-point reception and/or transmission. It is to be appreciated that apparatus 1100 is represented as including functional blocks, which can be functional blocks that represent functions implemented by a processor, software, or combination thereof (e.g., firmware). Apparatus 1100 can be implemented by a base station (e.g., base stations 110, 120, 210, and/or 220) and/or any other suitable network entity and can include a module 1102 for obtaining cell information from a neighbor cell via a backhaul, wherein the neighbor cell is included in a cooperating set associated with a mobile device, a module 1104 for generating a set of configuration parameters in accordance with the cell information, and a module 1106 for transmitting the set of configuration parameters to the mobile device.

Figure 12:
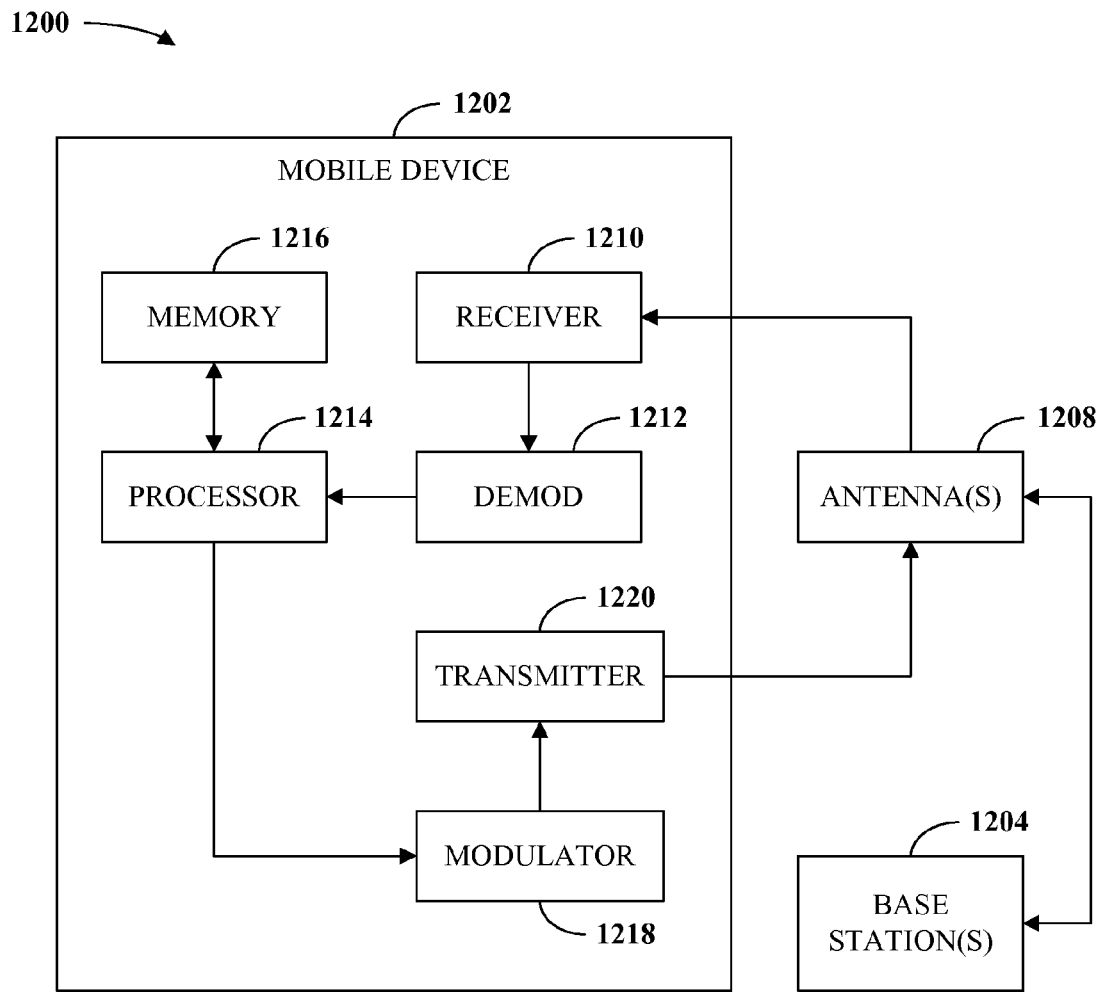
FIGS. 12-13 are block diagrams of respective wireless communication devices that can be utilized to implement various aspects of the functionality described herein.

FIG. 12 is a block diagram of another system 1200 that can be utilized to implement various aspects of the functionality described herein. In one example, system 1200 includes a mobile device 1202. As illustrated, mobile device 1202 can receive signal(s) from one or more base stations 1204 and transmit to the one or more base stations 1204 via one or more antennas 1208. Additionally, mobile device 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile device 1202. Mobile device 1202 can also include a modulator 1218 that can multiplex a signal for transmission by a transmitter 1220 through antenna(s) 1208.

Figure 13:
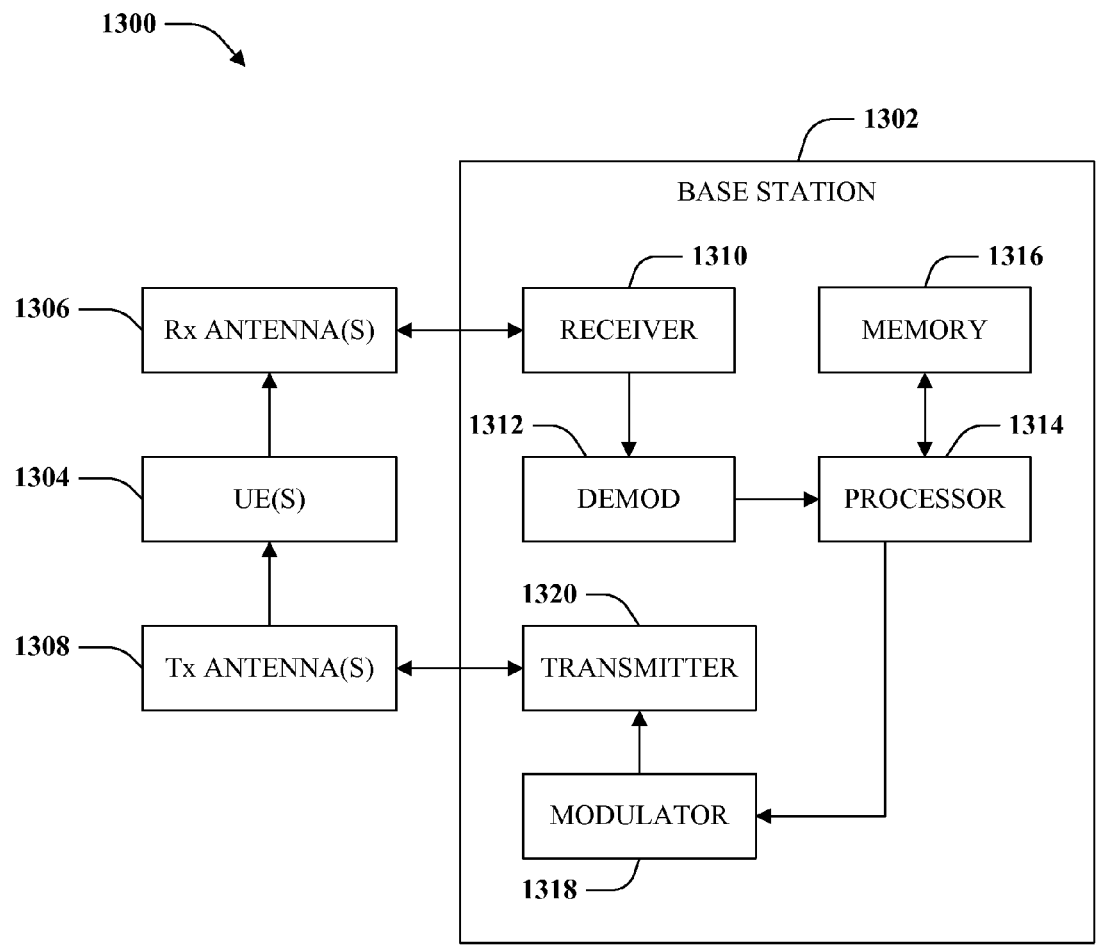

FIG. 13 is a block diagram of a system 1300 that can be utilized to implement various aspects of the functionality described herein. In one example, system 1300 includes a base station or base station 1302. As illustrated, base station 1302 can receive signal(s) from one or more UEs 1304 via one or more receive (Rx) antennas 1306 and transmit to the one or more UEs 1304 via one or more transmit (Tx) antennas 1308. Additionally, base station 1302 can comprise a receiver 1310 that receives information from receive antenna(s) 1306. In one example, the receiver 1310 can be operatively associated with a demodulator (Demod) 1312 that demodulates received information. Demodulated symbols can then be analyzed by a processor 1314. Processor 1314 can be coupled to memory 1316, which can store information related to code clusters, access terminal assignments, lookup tables related thereto, unique scrambling sequences, and/or other suitable types of information. Base station 1302 can also include a modulator 1318 that can multiplex a signal for transmission by a transmitter 1320 through transmit antenna(s) 1308.

Figure 14:
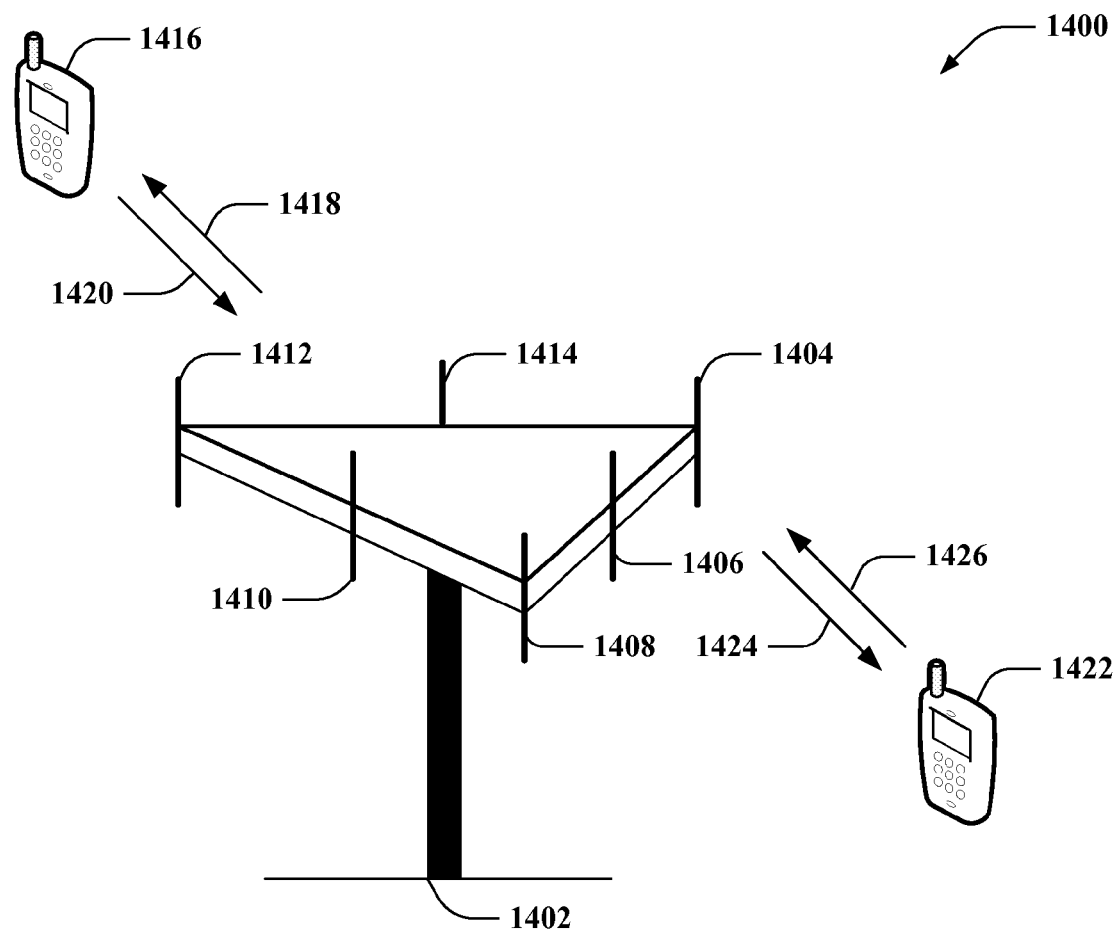
FIG. 14 is an illustration of a wireless communication system in accordance with various aspects set forth herein.

Referring now to FIG. 14, a wireless communication system 1400 is illustrated in accordance with various embodiments presented herein. System 1400 comprises a base station (e.g., access point) 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1402 can communicate with one or more UEs such as UE 1416 and UE 1422; however, it is to be appreciated that base station 1402 can communicate with substantially any number of UEs similar to UEs 1416 and 1422. UEs 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, UE 1416 is in communication with antennas 1412 and 1414, where antennas 1412 and 1414 transmit information to UE 1416 over a downlink 1418 and receive information from UE 1416 over an uplink 1420. Moreover, UE 1422 is in communication with antennas 1404 and 1406, where antennas 1404 and 1406 transmit information to UE 1422 over a downlink 1424 and receive information from UE 1422 over an uplink 1426. In a frequency division duplex (FDD) system, downlink 1418 can utilize a different frequency band than that used by uplink 1420, and downlink 1424 can employ a different frequency band than that employed by uplink 1426, for example. Further, in a time division duplex (TDD) system, downlink 1418 and uplink 1420 can utilize a common frequency band and downlink 1424 and uplink 1426 can utilize a common frequency band.

Each group of antennas and/or the area in which they are designated to communicate can be referred to as a sector of base station 1402. For example, antenna groups can be designed to communicate to UEs in a sector of the areas covered by base station 1402. In communication over downlinks 1418 and 1424, the transmitting antennas of base station 1402 can utilize beamforming to improve signal-to-noise ratio of downlinks 1418 and 1424 for UEs 1416 and 1422. Also, while base station 1402 utilizes beamforming to transmit to UEs 1416 and 1422 scattered randomly through an associated coverage, UEs in neighboring cells can be subject to less interference as compared to a base station transmitting through a single antenna to all its UEs. Moreover, UEs 1416 and 1422 can communicate directly with one another using a peer-to-peer or ad hoc technology (not shown).

According to an example, system 1400 can be a multiple-input multiple-output (MIMO) communication system. Further, system 1400 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1402 can communicate to the UEs 1416 and 1422 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 15:
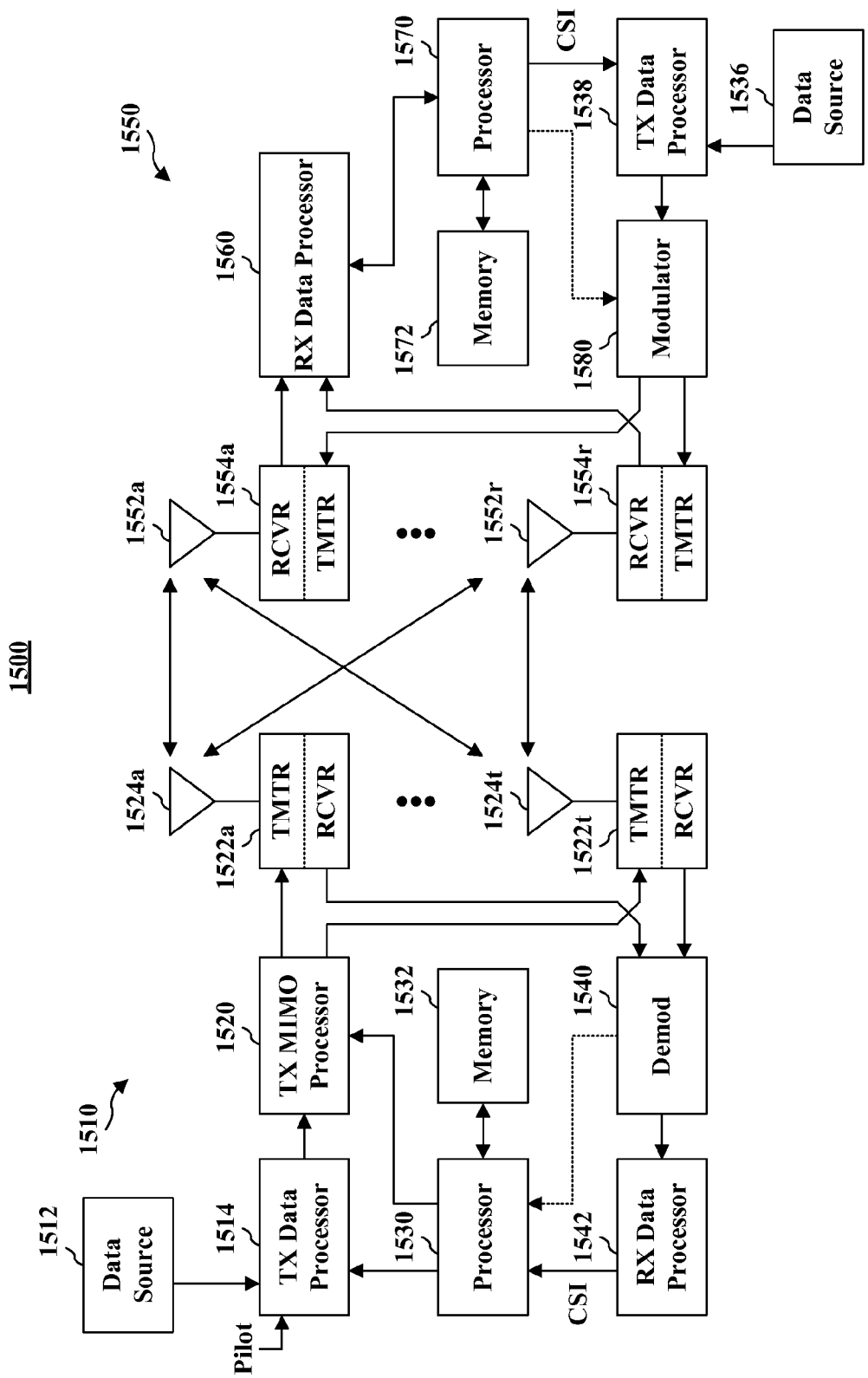
FIG. 15 is a block diagram illustrating an example wireless communication system in which various aspects described herein can function.

FIG. 15 shows an example wireless communication system 1500. The wireless communication system 1500 depicts one base station 1510 and one access terminal 1550 for sake of brevity. However, it is to be appreciated that system 1500 can include more than one base station and/or more than one access terminal, wherein additional base stations and/or access terminals can be substantially similar or different from example base station 1510 and access terminal 1550 described below. In addition, it is to be appreciated that base station 1510 and/or access terminal 1550 can employ the systems (FIGS. 1-4 and FIGS. 10-11) and/or method (FIGS. 5-9) described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At access terminal 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which available technology to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from access terminal 1550 are received by antennas 1524, conditioned by receivers 1522, demodulated by a demodulator 1540, and processed by a RX data processor 1542 to extract the reverse link message transmitted by access terminal 1550. Further, processor 1530 can process the extracted message to determine which precoding matrix to use for determining the beamforming weights.

Processors 1530 and 1570 can direct (e.g., control, coordinate, manage, etc.) operation at base station 1510 and access terminal 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   receiving, at a mobile device, first configuration information from a first node in a coordinated multi-point (CoMP) set, wherein the CoMP set includes a plurality of nodes that collaborate to provide coordinated reception or transmission of data between the plurality of nodes and the mobile device, and wherein the first configuration information comprises a CoMP offset that boosts a transmit power for a sounding reference signal (SRS) when the SRS is transmitted for reception by the plurality of nodes in the CoMP set relative to a transmit power of the SRS when the SRS is transmitted in a single-node configuration;
   determining, by the mobile device, the transmit power for the SRS based at least in part on a physical uplink shared channel transmit power and the CoMP offset; and
   transmitting the SRS to at least one node in the plurality of nodes.

2. The method of claim 1, wherein the first configuration information includes a set of parameters related to SRS transmission, wherein the set of parameters includes at least one of a bandwidth parameter, a periodicity parameter, a subframe offset, a hopping bandwidth parameter, a transmission comb parameter, a starting physical resource block assignment, a transmission duration parameter, a cyclic shift parameter, or a transmit power offset.

3. The method of claim 2, wherein transmitting the SRS is based upon at least one of the bandwidth parameter or the cyclic shift parameter.

4. The method of claim 2, further comprising mapping the SRS to a set of resource elements in a subframe, wherein the set of resource elements is determined in accordance with at least one of the bandwidth parameter, the hopping bandwidth parameter, the subframe offset, the transmission comb parameter, or the starting physical resource block assignment.

5. The method of claim 1, further comprising receiving, at the mobile device, second configuration information from a second node in the CoMP set, wherein the second node is associated with a non-serving cell and the first node is associated with a serving cell.

6. The method of claim 5, further comprising:
   combining the first configuration information and the second configuration information; and
   generating the SRS based upon the first configuration information and the second configuration information.

7. The method of claim 1, wherein the CoMP offset is configured based upon various parameters associated with nodes in the CoMP set.

8. The method of claim 1, further comprising:
   receiving a power control command from at least one node in the CoMP set; and
   incrementally adjusting the transmit power for the SRS in accordance with the power control command.

9. The method of claim 1, wherein transmitting the SRS further comprises:
   partitioning a system bandwidth into a plurality of chunks;
   selecting a first portion of a first chunk for a first transmission of the SRS; and
   hopping to a second portion of the first chunk for a second transmission of the SRS.

10. The method of claim 9, further comprising hopping to a second chunk in the plurality of chunks after a predetermined number of hops within the first chunk, wherein a subsequent transmission of the SRS utilizes at least a portion of the second chunk.

11. A wireless communications apparatus, comprising:
    at least one processor configured to:
      receive, at a mobile device, first configuration information from a node in coordinated multi-point (CoMP) set, wherein the CoMP set includes a plurality of nodes that collaborate to provide coordinated reception or transmission of data between the plurality of nodes and the mobile device, and wherein the first configuration information comprises a CoMP offset that boosts a transmit power for a sounding reference signal (SRS) when the SRS is transmitted for reception by the plurality of nodes in the CoMP set relative to a transmit power of the SRS when the SRS is transmitted in a single-node configuration;
      determine, by the mobile device, the transmit power for the SRS based at least in part on a physical uplink shared channel transmit power and the CoMP offset; and
      transmit the SRS to at least one node in the plurality of nodes.

12. The wireless communications apparatus of claim 11, wherein the at least one processor is further configured to:
    receive, at the mobile device, second configuration information from a second node of the CoMP set; and
    combine the second configuration information with the first configuration information; and
    generate the SRS based upon the second configuration information and the first configuration information.

13. The wireless communications apparatus of claim 11, wherein the at least one processor is further configured to:
    receive power control commands from at least one node in the CoMP set; and
    adjust the transmit power for the SRS in accordance with the power control commands.

14. The wireless communications apparatus of claim 11, wherein the at least one processor is further configured to:
    partition a system bandwidth into a plurality of chunks;
    select a first portion of a first chunk;
    utilize the first portion of the first chunk to transmit the SRS; and
    selecting a second portion of the first chunk for a second transmission of the SRS.

15. The wireless communications apparatus of claim 14, wherein the at least one processor is further configured to hop to a second chunk in the plurality of chunks.

16. An apparatus, comprising:
    means for receiving, at a mobile device, first configuration information from a first node in a coordinated multi-point (CoMP) set, wherein the CoMP set includes a plurality of nodes that collaborate to provide coordinated reception or transmission of data between the plurality of nodes and the mobile device, and wherein the first configuration information comprises a CoMP offset that boosts a transmit power for a sounding reference signal (SRS) when the SRS is transmitted for reception by the plurality of nodes in the CoMP set relative to a transmit power of the SRS when the SRS is transmitted in a single-node configuration;

means for determining, by the mobile device, the transmit power for the SRS based at least in part on a physical uplink shared channel transmit power and the CoMP offset; and means for transmitting the SRS to at least one node in the plurality of nodes.

17. The apparatus of claim 16, wherein the first configuration information includes a set of parameters related to a SRS transmission, wherein the set of parameters includes at least one of a bandwidth parameter, a periodicity parameter, a subframe offset, a hopping bandwidth parameter, a transmission comb parameter, a starting physical resource block assignment, a transmission duration parameter, a cyclic shift parameter, or a transmit power offset.

18. The apparatus of claim 16, further comprising means for receiving second configuration information from a second node in the CoMP set, wherein the second node is associated with a non-serving cell and the first node is associated with a serving cell.

19. The apparatus of claim 18, further comprising:
means for integrating the first configuration information and the second configuration information; and
means for generating the SRS based upon the first configuration information and the second configuration information.

20. The apparatus of claim 16, further comprising:
means for receiving a power control command from at least one node in the CoMP set; and
means for adjusting the transmit power for the SRS by an increment in accordance with the power control command.

21. A computer program product, comprising:
a non-transitory computer-readable medium, comprising:
code for causing at least one computer to receive, at a mobile device, first configuration information from a first node in a coordinated multi-point (CoMP) set, wherein the CoMP set includes a plurality of nodes that collaborate to provide coordinated reception or transmission of data between the plurality of nodes and the mobile device, and wherein the first configuration information comprises a CoMP offset that boosts a transmit power for a sounding reference signal (SRS) when the SRS is transmitted for reception by the plurality of nodes in the CoMP set relative to a transmit power of the SRS when the SRS is transmitted in a single-node configuration;
code for causing the at least one computer to set the transmit power for the SRS based at least in part on a physical uplink shared channel transmit power and the CoMP offset; and
code for causing the at least one computer to transmit the SRS to at least one node in the plurality of nodes.

22. The computer program product of claim 21, the computer-readable medium further comprising:
code for causing the at least one computer to receive, at the mobile device, second configuration information from a second node of the CoMP set; and
code for causing the at least one computer to combine the second configuration information with other configuration information; and
code for causing the at least one computer to generate the SRS based upon the second configuration information and the other configuration information.

23. An apparatus, comprising:
a configuration module that obtains, at a mobile device, first configuration information from a first node in a coordinated multi-point (CoMP) set and generates a set of configuration parameters in accordance with the first configuration information, wherein the CoMP set includes a plurality of nodes that collaborate to provide coordinated reception or transmission of data between the plurality of nodes and the mobile device, and wherein the first configuration information comprises a CoMP offset that boosts a transmit power for a sounding reference signal (SRS) when the SRS is transmitted for reception by the plurality of nodes in the CoMP set relative to a transmit power of the SRS when the SRS is transmitted in a single-node configuration;
a power module that determines a transmit power for the SRS based at least in part on a physical uplink shared channel transmit power and the CoMP offset; and
and a transmission module that transmits the SRS to at least one node in the cooperating set.

24. The apparatus of claim 23, wherein the configuration module controls the power module and the transmission module.

25. The apparatus of claim 23, wherein the power module adjusts the transmit power for the SRS in accordance with power control commands received from at least one node in the CoMP set.

26. A method, comprising: obtaining cell information from a neighbor cell via a backhaul, wherein the neighbor cell is included in a coordinated multi-point (CoMP) set associated with a mobile device, wherein the CoMP set includes a plurality of nodes that collaborate to provide coordinated reception or transmission of data between the plurality of nodes and the mobile device;
generating a set of configuration parameters in accordance with the cell information, wherein the set of configuration parameters comprises a CoMP offset that boosts a transmit power for a sounding reference signal (SRS) of the mobile device when the SRS is transmitted for reception by the plurality of nodes in the CoMP set relative to a transmit power of the SRS when the SRS is transmitted in a single-node configuration; and
transmitting the set of configuration parameters to the mobile device.

27. The method of claim 26, wherein the set of configuration parameters include at least one of a bandwidth parameter, a periodicity parameter, a subframe offset, a hopping bandwidth parameter, a transmission comb parameter, a starting physical resource block assignment, a transmission duration parameter, a cyclic shift parameter, or a transmit power offset.

28. The method of claim 27, further comprising selecting the periodicity parameter and the subframe offset to achieve orthogonality to SRS transmissions by other mobile devices.

29. The method of claim 27, further comprising generating the CoMP offset as a plurality of groups of values, wherein each group is associated with a particular CoMP set size.

30. The method of claim 27, further comprising determining an optimal value of the CoMP offset based, in part, on at least one of channel characteristics, cell loading information, or a size of the CoMP set.

31. The method of claim 26, wherein the cell information includes at least one of cell loading information, interference level information, measurement information, channel estimates, configuration parameters, or power control information.

32. The method of claim 26, further comprising:
identifying a power adjustment to the transmit power of the SRS based at least in part on the cell information; and
transmitting a power control command to the mobile device.

33. An apparatus, comprising:
a cell information evaluation module that obtains cell information from a neighbor cell, wherein the neighbor cell is included in a coordinated multi-point (CoMP) set with the apparatus, wherein the CoMP set includes a plurality of nodes that collaborate to provide coordinated reception or transmission of data between the plurality of nodes and a mobile device; a configuration module that generates a set of configuration parameters in accordance with the cell information, wherein the set of configuration parameters comprises a CoMP offset that boosts a transmit for a sounding reference signal (SRS) of the mobile device when the SRS is transmitted for reception by the plurality of nodes in the CoMP set relative to a transmit power of the SRS when the SRS is transmitted in a single-node configuration; and
a transmitter that sends the set of configuration parameters to the mobile device.

34. The apparatus of claim 33, further comprising a power control module that generates at least one of power control configuration parameters or power control commands.

35. The apparatus of claim 33, further comprising an evaluation module that receives a SRS from the mobile device, analyzes the SRS, and generates a channel estimate based upon the SRS.

36. A wireless communications apparatus, comprising:
means for obtaining cell information from a neighbor cell via a backhaul, wherein the neighbor cell is included in a coordinated multi-point (CoMP) set associated with a mobile device, wherein the CoMP set includes a plurality of nodes that collaborate to provide coordinated reception or transmission of data between the plurality of nodes and the mobile device;
means for generating a set of configuration parameters in accordance with the cell information, wherein the set of configuration parameters comprises a CoMP offset that boosts a transmit power for a sounding reference signal (SRS) of the mobile device when the SRS is transmitted for reception by the plurality of nodes in the CoMP set relative to a transmit power of the SRS when the SRS is transmitted in a single-node configuration; and
means for transmitting the set of configuration parameters to the mobile device.

37. The wireless communications apparatus of claim 36, wherein the set of configuration parameters include at least one of a bandwidth parameter, a periodicity parameter, a subframe offset, a hopping bandwidth parameter, a transmission comb parameter, a starting physical resource block assignment, a transmission duration parameter, a cyclic shift parameter, or a transmit power offset.

38. The wireless communications apparatus of claim 37, further comprising means for selecting the periodicity parameter and the subframe offset to achieve orthogonality to SRS transmissions by other mobile devices.

39. The wireless communications apparatus of claim 37, further comprising means for generating the CoMP offset as a plurality of groups of values, wherein each group is associated with a particular CoMP set size.

40. The wireless communications apparatus of claim 37, further comprising means for determining an optimal value of the CoMP offset based, in part, on at least one of channel characteristics, cell loading information, or a size of the CoMP set.

41. The wireless communications apparatus of claim 36, wherein the cell information includes at least one of cell loading information, interference level information, measurement information, channel estimates, configuration parameters, or power control information.

42. The wireless communications apparatus of claim 36, further comprising:
means for identifying a power adjustment to the transmit power of the SRS based at least in part on the cell information; and
means for sending a power control command to the mobile device.

43. A computer program product, comprising:
a non-transitory computer-readable medium, comprising:
code for causing at least one computer to obtain cell information from a neighbor cell via a backhaul, wherein the neighbor cell is included in a coordinated multi-point (CoMP) set associated with a mobile device, wherein the CoMP set includes a plurality of nodes that collaborate to provide coordinated reception or transmission of data between the plurality of nodes and the mobile device
code for causing the at least one computer to generate a set of configuration parameters in accordance with the cell information, wherein the set of configuration parameters comprises a CoMP offset that boosts a transmit power for a sounding reference signal (SRS) of the mobile device when the SRS is transmitted for reception by the plurality of nodes in the CoMP set relative to a transmit power of the SRS when the SRS is transmitted in a single-node configuration; and
code for causing the at least one computer to transmit the set of configuration parameters to the mobile device.

44. The computer program product of claim 43, the non-transitory computer-readable medium further comprising:
code for causing the at least one computer to identify a power adjustment to transmit power of the SRS based at least in part on the cell information; and
code for causing the at least one computer to transmit a power control command to the mobile device.

45. A wireless communications apparatus, comprising:
at least one processor configured to:
receive cell information from a neighbor cell via a backhaul, wherein the neighbor cell is included in a cooperating set associated with a mobile device, wherein the neighbor cell is included in a coordinated multi-point (CoMP) set associated with a mobile device, wherein the CoMP set includes a plurality of nodes that collaborate to provide coordinated reception or transmission of data between the plurality of nodes and the mobile device
determine a set of configuration parameters in accordance with the cell information, wherein the set of configuration parameters comprises a CoMP offset that boosts a transmit power for a sounding reference signal (SRS) of the mobile device when the SRS is transmitted for reception by the plurality of nodes in the CoMP set relative to a transmit power of the SRS when the SRS is transmitted in a single-node configuration; and
transmit the set of configuration parameters to the mobile device.

* * * * *